United States Patent
Willard et al.

(10) Patent No.: US 8,429,050 B2
(45) Date of Patent: Apr. 23, 2013

(54) METHOD FOR DETECTING INELIGIBILITY OF A BENEFICIARY AND SYSTEM

(76) Inventors: Mary Joan Willard, Mill Valley, CA (US); Allan Victor Burman, Arlington, VA (US)

( * ) Notice: Subject to any disclaimer, the term of this patent is extended or adjusted under 35 U.S.C. 154(b) by 0 days.

(21) Appl. No.: 13/281,531

(22) Filed: Oct. 26, 2011

(65) Prior Publication Data
US 2012/0109806 A1    May 3, 2012

Related U.S. Application Data

(60) Provisional application No. 61/456,029, filed on Nov. 1, 2010.

(51) Int. Cl.
*G06Q 40/00* (2012.01)
(52) U.S. Cl.
USPC ................................. 705/35; 705/38
(58) Field of Classification Search .............. 705/35, 705/38
See application file for complete search history.

(56) References Cited

U.S. PATENT DOCUMENTS

| | | | | |
|---|---|---|---|---|
| 5,708,422 A | * | 1/1998 | Blonder et al. | 340/5.41 |
| 6,456,979 B1 | * | 9/2002 | Flagg | 705/4 |
| 7,657,474 B1 | * | 2/2010 | Dybala et al. | 705/35 |
| 7,818,188 B1 | | 10/2010 | Allsup et al. | |
| 2010/0217701 A1 | | 8/2010 | Mesilaty | |

OTHER PUBLICATIONS

Zaritsky, Howard M. "Tax Management Estates, Gifts & Trusts Journal"; v31n1, pp. 3-55, Jan./Feb. 2006; ISSN: 0886-3547.*
Liviingstone, Jane R; Harden, J William; Biggart, Timothey B. "The American Jobs Creation Act of 2004: A Review of Key Provisions"; v59n1; pp. 80-90; Jan. 2005; ISSN: 1537-1816.*
Fevurly, Keith. "Planning for Incapacity: What Every Financial Planner Should Know"; v17n2; pp: 56-63; Feb. 2004; ISSN: 1040-3981.*

* cited by examiner

*Primary Examiner* — Lalita M Hamilton
*Assistant Examiner* — Edward Chang
(74) *Attorney, Agent, or Firm* — Mark R. Malek, Esq.; Daniel C. Pierron, Esq.; Zies Widerman & Malek

(57) ABSTRACT

A method and system are presented for identifying improper benefit payments to an ineligible beneficiary. Record data may be accessed from a financial institution and may be analyzed to identify patterns within the banking transactions. Deviations may be identified between a pre-benefit pattern and a post-benefit pattern by applying one or more rules, which may be ranked. The deviations that are identified may be determined to be either in compliance, in noncompliance, or within some acceptable level of compliance. A level of noncompliance outside of a range of acceptable noncompliance may result in generating a request for an action to be taken, such as an audit of the beneficiary. The aforementioned methods may be carried out using a computerized device.

19 Claims, 11 Drawing Sheets

METHOD FOR DETECTING INELIGIBILITY OF A BENEFICIARY AND SYSTEM

RELATED APPLICATIONS

This application is related to and claims the benefit of U.S. Provisional Patent Application Ser. No. 61/456,029 titled FACILITATING THE INTEGRITY OF GOVERNMENT PAYMENTS BY USING PATTERNS OF BANKING TRANSACTIONS AS A MEANS OF IDENTIFYING INDIVIDUALS TO BE EMPLOYED AT A LEVEL THAT RENDERS THEM INELIGIBLE FOR SUCH PAYMENTS, filed on Nov. 1, 2010, the entire contents of each of which are incorporated herein by reference.

FIELD OF THE INVENTION

The present invention relates to the field of analyzing data to produce a request for an action and, more specifically, to access and interface with to be used to increase accuracy and efficiency of detecting ineligibility to receive a benefit based on one or more rule.

BACKGROUND OF THE INVENTION

Federal and State governments employ a variety of programs to provide social welfare to its citizens that may fall upon hard times. One such government financed social welfare program, as it is provided to citizens of the United States, includes paying benefits paid to unemployed citizens that have became unemployed through no fault of their own. Other social welfare programs may be provided to citizens of a country that are underpaid, or struggling to raise a family. Furthermore, a wide variety of additional governmental subsidies may be paid to citizens due to their low income and/or employment status. Examples of such support include disability payments, unemployment benefits, retirement benefits, health care coverage and child support payments.

Unfortunately, a number of citizens may be receiving a benefit from the governmental social welfare programs despite their ineligibility to receive such benefits. Governmental agencies providing the assistance have traditionally been forced to rely on the allegations from an applicant or beneficiary regarding his or her employment status, earnings, and other factors affecting eligibility to receive a benefit. The agencies have relied on self-reporting primarily because timely information from independent sources had been unavailable. Further, during harder economic times, the volume of benefit receiving citizens may be so high that it becomes burdensome to verify the eligibility of the citizens to receive the benefits.

Employment information from the state or National Directory of New Hire Databases, the Quarterly Earnings Reports, or the IRS may be up to 18 months old by the time the information is reported to a government agency. Additionally, these sources of information cannot identify potential beneficiaries that may be working "under the table," or being paid in cash without reporting to an agency, such as the IRS or the Social Security Administration. As a result, state and federal agencies that rely on self-reports from beneficiaries routinely pay benefits to beneficiaries that are ineligible to receive them.

Payment integrity is compromised with the taxpayer picking up the tab for erroneous claims. Whether deliberate fraud, errors, or inadvertent omissions, such payments to ineligible beneficiaries also create stress and burdensome paperwork for beneficiaries who may learn, months after the fact, that they are expected to repay money they have improperly received, but have already spent. What is needed is a timely and independent method of verifying employment and/or income streams that would reduce the frequency with which improper payments occur.

U.S. Pat. No. 7,818,188 to Allsup, et al. discloses a method of recovering overpayment of long-term disability benefits paid to a claimant by a client after the receipt of Social Security disability insurance payment. The Service Provider requests specific information from the Social Security Administration regarding the award of Social Security Disability Insurance benefits, and upon receiving that information the Service Provider may determine the amount of the overpayment. The payee will have previously authorized any overpayment amount to be withdrawn electronically from his or her bank account.

Although the '188 patent is directed to reclaiming overpayment of benefits, it fails to seek relevant information, indicative of fraud on the part of the recipient, or error on the part of the beneficiary or government agency Furthermore, the '188 patent fails to perform an investigative identification of a pattern. In the '188 patent there is no investigation required, but rather the information as to the amount of overpayment is provided to the Service Provider who then simply takes that information and implements a process for recovering the overpayment.

U.S. Pat. No. 7,657,474 to Dybala, et al. discloses one such method for the automated detection of selected patterns of financial transactions characterized as customer or trader behaviors and activities, and specific events or sequence of events. The specific implementation relates to identifying trading compliance violations for transactions involving fixed income securities. In the '474 patent, common elements are linked between multiple events, entities and activities. As the associations extend beyond the original sources, the common elements may be identified through direct or indirect association among the various events, entities and activities. Elements of interest may be retrieved, collected or processed from a general data source and may be stored in a separate database or dataset. As additional elements are evaluated, the matches and the link between elements may also be stored. This process may continue for the various elements and data sources.

The '474 patent, however, does not include a simple solution and, instead, requires application of complex rules that are specific to a particular purpose of identifying trade violations. Furthermore, the '474 patent provides a proposed solution to a narrow problem, with limited applicability and expandability to the effective detection of ineligible beneficiaries of benefits through social welfare programs.

U.S. Patent Application Publication No. 2010/0217701 to Mesilaty discloses evaluating some or all past transactions of the customer and executes an analysis, including statistical calculations and evaluations, according to predefined methods and algorithms, to identify patterns in the transactions of the customer's account. The patterns that may be identified by the application may be further processed and analyzed to produce a prediction sheet, which may estimate other future transactions of the customer's account.

However, the '701 patent limits review of the transactions provide a predictive analysis of future events, without determining the validity of past events. Although the '701 patent may engage in profiling to create a predictive analysis of what the banking transactions should look like, it fails to provide a method to identify deviation from that which would be considered anticipated behavior and also fails to indicate the potential ineligibility of a beneficiary. The '701 patent also fails to disclose requesting a more thorough investigation upon determining potential ineligibility of a beneficiary It is already the case that government agencies such as the Social Security Administration have, in 2011, began a national program to interface with financial institutions across the country to verify the assets of recipients of Supplemental Security Insurance (SSI) benefits and applicants for such benefits. Through a contractor, for example, Accuity, the Social Security Administration contacts banks in the geographic area in which the beneficiary or applicant lives and requests that the financial organization search their databases for accounts that may be held by the SSI recipient or applicant. When accounts are found, the financial institution provides beginning and end of the month balances for the account holder. While this existing system may assist to verify the assets of a beneficiary, it lacks usefulness for verifying the employment status of the beneficiary, and thus the eligibility to receive a benefit. The existence of current employment earnings, and the amount of those earnings, can be critical factors in determining if applicants are eligible for certain government benefits, or if those already receiving such benefits have become ineligible. As a result, there exists a need to determine the employment status of an intended beneficiary that is lacking in the prior art.

Therefore, there exists a need for a method and system for accessing records, such as from financial institutions, relating to a beneficiary, analyzing the records for patterns indicating employment at a level that would render the individual ineligible to receive a benefit, generating a request for an action to be performed by an agency user, and performing the action that may result in a government agency determining that the beneficiary has received improper payments.

SUMMARY OF THE INVENTION

With the foregoing in mind, the present invention advantageously allows an agency to readily detect whether or not a beneficiary remains eligible to continue receiving the benefit, with an increased level of efficiency and confidence over manual detection and self-reported eligibility. The present invention may also advantageously be used to determine whether or not a potential beneficiary is eligible to receive a benefit that the potential beneficiary is not yet receiving. The method and system according to an embodiment of the present invention is also advantageously simple to install and user friendly.

These and other objects, features and advantages according to an embodiment of the present invention are provided by a method for determining ineligibility of a beneficiary receiving a benefit to continue to receive the benefit. The method may include accessing record data from a financial institution relating to banking transactions of the beneficiary. The method may additionally include analyzing the record data to determine a pattern of the banking transactions for a time period prior to receiving the benefit that may be defined as a pre-benefit pattern. The method may also include analyzing the record data to determine a pattern of banking transactions for a time period after receiving the benefit that may be defined as a post-benefit pattern. The method may then include identifying deviations between the pre-benefit pattern and the post-benefit pattern.

The method may also include applying a rule selected from a plurality of rules to the deviations to determine noncompliance of the deviations with the rule. The rules may be stored on a database and may be weighted, or ranked. The method may further include determining a level of noncompliance of the deviations by ranking the noncompliance of each deviation to determine if the level of noncompliance is within a range of acceptable noncompliance. Compliance with the rule may result in no action being taken. A level of noncompliance within the range of acceptable noncompliance may additionally result in no action being taken. However, a level of noncompliance outside the range of acceptable noncompliance may result in generating a request for an action to be taken, which may be provided to a user using a user interface.

According to an embodiment of the present invention, performing the steps of the method, including accessing the record data, analyzing the record data, identifying the deviations between the pre-benefit pattern and the post-benefit pattern, applying the rule, determining the level of noncompliance, and determining if the level of noncompliance is within the range of acceptable noncompliance may be carried out using a computerized device.

The action that may be requested may be auditing the record data relating to the beneficiary upon determining that the level of noncompliance is outside of the range of acceptable noncompliance. Additionally, the action requested may include auditing the record data relating to the beneficiary upon determining that the level of noncompliance outside of the range of acceptable noncompliance is above an audit threshold. An additional action may include communicating with the beneficiary upon determining that the level of noncompliance with the rules outside the range of acceptable noncompliance is below the audit threshold.

According to an embodiment of the present invention, the record data may include data that relates to a deposit of funds. Analyzing the record data may further include analyzing the data relating to the deposit to indicate the pattern of the banking transactions. Similarly, the record data may include data relating to a withdrawal of funds. Analyzing the record data may further include analyzing the data relating to the withdrawal to indicate the pattern of the banking transactions. The record data may include data relating to a deposit of funds and a withdrawal of funds. Analyzing the record data may further include analyzing the deposit and withdrawal to indicate the pattern of banking transactions.

The method may still further include providing the benefit to the beneficiary upon determining that the level of noncompliance is within the range of acceptable noncompliance. The method may also include defining a savings to include a difference between the benefit provided to the beneficiary prior to the benefit being denied and the benefit provided to the beneficiary subsequent to the benefit beings being denied. Thereafter, a portion of the savings may be shared with a third party.

The computerized device may include a network interface that connects to a network, and the method may also include communicating with a banking computerized device through the network. The method may further include communicating with a record custodian computerized device through the network. The computerized device may additionally access a status record indicative of ineligibility to receive the benefit from the record custodian computerized device. The status record may include evidence of the level of noncompliance with the rules.

Machine learning may be used to determine whether the level of noncompliance with the rules is within the range of acceptable noncompliance. This may include receiving feedback relating to an accuracy of the determination of ineligibility of the beneficiary, accessing the feedback prior to generating a subsequent request for the action, and analyzing the feedback to improve the accuracy of the subsequent request for the action. The feedback may be indicative of the accuracy of a prior recommended action.

A system may also be provided for determining ineligibility of a beneficiary receiving a benefit to continue to receive the benefit. The system may include a network interface on a computerized device that connects to a network. The computerized device may include a memory and a processor. A banking computerized device in communication with the network may be included. Record data from a financial institution relating to banking transactions of the beneficiary may be accessed using the computerized device. Additionally, the record data may be analyzed using the computerized device to determine a pattern of the banking transactions. In an embodiment of the present invention, the analysis may be completed within the financial institution using information on suspect beneficiaries, which may be potentially ineligible to receive the benefit, being the only information being intercommunicated between the financial institution and the government agency.

A rule may be selected from a plurality of rules stored on a database. The rule may be applied to the pattern of the banking transactions using the computerized device to determine a level of noncompliance. The level of noncompliance of the pattern may be determined to be within a range of acceptable noncompliance using the computerized device. Compliance with the rule may result in no action being taken. A level of noncompliance within the range of acceptable noncompliance may also result in no action being taken. Alternatively, a level of noncompliance outside the range of acceptable noncompliance may result in generating a request using the computerized device for an action to be taken. The request for the action to be taken may be provided to a user using a user interface.

DETAILED DESCRIPTION OF THE INVENTION

Figure 1:
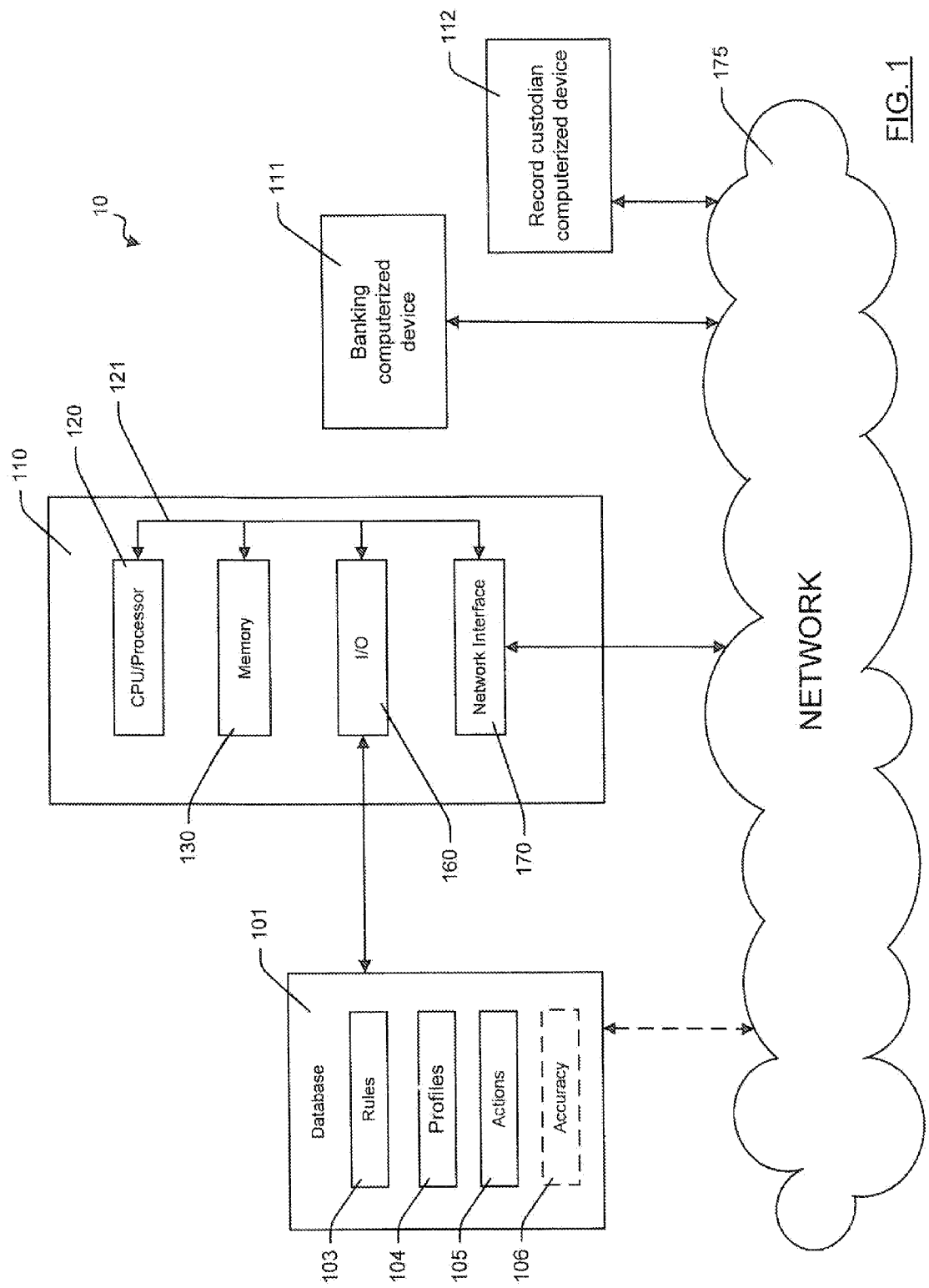
FIG. 1 is a block diagram of the system for determining ineligibility of a beneficiary receiving a benefit to continue to receive the benefit, according to an embodiment of the present invention.

The present invention will now be described more fully hereinafter with reference to the accompanying drawings, which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Additionally, in the following disclosure, a user interface may be discussed through which a user may interact with the system 10 disclosed herein. The user interface may be one of a plurality of computerized interfaces, including monitors, screens, audio alerts, or other electronically generated communications that may be used to provide a user with information. A user interface may additionally include printed documents, paper reports, supplemental inserts to be included within existing reports, and related memoranda. Skilled artisans will appreciate a user interface to generally include any object or device, electronic or not, that may be capable of informing a user of one or more parameters determined by the system 10.

Referring now to FIGS. 1-11, a system 10 for detecting the ineligibility of a beneficiary according to the present invention is now described in greater detail. Throughout this disclosure, the system 10 for detecting the ineligibility of a beneficiary may also be referred to as an ineligibility detection system, a system, or the invention. Alternate references of the system 10 in this disclosure are not meant to be limiting in any way. A person of skill in the art will appreciate that, although the present invention is described herein for determining, with an increased level of efficiency and confidence over manual detection and self-reported eligibility, that a beneficiary may likely be ineligible to receive a benefit relating to government funded social welfare programs, the present invention should not be limited to such public programs. For example, and without limitation, the system 10 of the present invention may be additionally used to analyze records to identify patterns, such as banking transactions, that indicate ineligibility, or requirements to pay, relating to child support payments, disability, alimony, judgments, bankruptcy, or virtually any other program wherein a participant may be determined to be ineligible to receive a benefit upon failure to comply with a condition. Further, the system 10 of the present invention is not mean to be limited to use in the United States. Instead, the system 10 of the present invention is suitable to be used in connection with any agency throughout the world that provides various types of benefits to its citizens, or for private industries that provide certain benefits to its employees.

In the following disclosure, various elements may be described to manipulate and analyze data stored within one or more database. As would be appreciated by a person of skill in the art, these elements may be operated on a computerized device 110. A person of skill in the art will a appreciate that the database may be included in a database server, which may include one or more additional databases collectively or independently accessed and analyzed by a computerized device 110. Additionally, the various illustrative program modules and steps disclosed herein may be implemented via electronic hardware, computer software, or combinations of both. The various illustrative program modules and steps have been described generally in terms of their functionality. Whether the functionality is implemented as hardware or software depends, in part, upon the hardware constraints imposed on the system 10. Hardware and software may be interchangeable depending on such constraints.

Provided as a non-limiting example, the various illustrative program modules and steps, described in connection with the embodiments disclosed herein, may be implemented or performed via a computerized device 110. Such computerized devices 110 may include, but should not be limited to, an application specific integrated circuit (ASIC), a field programmable gate array (FPGA), other programmable logic device, discrete gate logic, transistor gate logic, discrete hardware components, conventional programmable software module and a processor, or any combination thereof that may be designed to perform the functions described herein.

The system 10 of this disclosure may advantageously facilitate the consistent, accurate, and expedited assessment as to whether or not a beneficiary is probably eligible to continue receiving a benefit, i.e., the system 10 and method according to an embodiment of the present invention advantageously identifies patterns of banking transactions that may indicate probable ineligibility of a beneficiary to continue receiving a benefit. After detecting the pattern, the system 10 may generate a request for an action to be performed by the agency. The accuracy of the pattern detection that may lead to the requests may be dynamically improved through machine learning. These advantages and features will be discussed in greater detail throughout the following disclosure. Those skilled in the art will appreciate that the pattern detection may be provided using an algorithm that may lead to a request for the action to be performed by the agency.

The system 10 of the present invention may be considered an employment detection system. In other words, the system according to the present invention advantageously detects employment earnings via an analysis of deposit records from the beneficiary's financial institution. Although this specification describes the analysis of banking transactions, it is preferred that deposits made into the financial institution of the beneficiary be analyzed to assess a probability of whether or not the beneficiary is receiving compensation while simultaneously receiving the benefit and, if so, whether or not that compensation rises to a level to make the beneficiary ineligible to receive the benefit.

Referring now to FIG. 1, the system 10 of the present invention will now be discussed. The system 10 may include a computerized device 110 communicable with additional computerized devices 110 over a network 175 connection. The additional computerized devices 110 may include, for example and without limitation, a banking computerized device 111 and/or a record custodian computerized device 112. The computerized device 110 may additionally include, or be communicatively connected to, a database 101. The computerized device 110 may access and analyze a record to determine whether a beneficiary is ineligible to receive a benefit. More particularly, the system 10 and method according to an embodiment of the present invention advantageously allows for an assessment to be made as to whether or not a beneficiary that is currently receiving a benefit is likely to be eligible to receive a benefit, or whether a potential beneficiary that desires to receive a benefit is eligible to receive such a benefit. The analysis may include detecting one or more patterns in the record data, assigning a strength to a respective pattern, and determining the accuracy of the assessment by having the user agency follow-up to verify whether the pattern detected was, in fact, related to employment by the beneficiary at a level that would render the beneficiary ineligible to receive certain benefits.

When determining a pattern, several different critical variables may be analyzed. For example, the critical variables may include the size of a deposit, the interval of deposits, the source of deposits, or any other number of specific critical variables as may be understood by the skilled artisan. In addition, the existence of a deposit stream pre-benefit period can rule out its potential relevance in a post-benefit period. The following examples are not meant to be limiting in any way, but are provided for clarity of the types of variables that are considered when analyzing the record data to determine a pattern. In one example, the system 10 may analyze deposits made prior to the beneficiary receiving the benefit and deposits made after receiving the benefit to determine a respective pre-benefit pattern and a post-benefit pattern. In some instances, the system 10 may be attempting to identify deposits that may be out of the ordinary with respect to the size of the deposit, the intervals between deposits, e.g. the frequency of deposits, the source of the deposits, or any other number of critical variables relating to deposits that may be analyzed to determine a deposit pattern. The deposit pattern may be analyzed with respect to certain thresholds that may be set to determine whether or not the deposit pattern is in compliance with certain standards, or rules. With respect to intervals of deposits, if, for example, the intervals of deposits after the beneficiary has started to receive a benefit, is consistent with a profile of a beneficiary that has a job and deposits are made, also for example, weekly or biweekly, then an indication of noncompliance, or some level of noncompliance, may be provided by the system 10. In this disclosure, the terms frequency and interval when relating to deposits can be interchangeably used. In other words, the system 10 according to an embodiment of the present invention may conduct an analysis of the frequency of deposits made into an account of a beneficiary, or the interval between when deposits are made into an account of a beneficiary. If the frequency of the deposits, or the interval between when the deposits are made are similar to those indicating employment, e.g., a weekly deposit that is similar, or a bi-weekly deposit that is similar which may indicate a steady paycheck, then an indication of noncompliance, or a level of noncompliance may be provided. Similarly, if the amounts of the deposits are indicative of significant work activity, or if there is an indication of a deposit pattern indicative of employment started post-benefit period, then an indication of noncompliance, or some level of noncompliance, may be provided. This type of analysis can occur for any number of variables associated with a deposit, or any number of variables associated with any banking transaction.

Those skilled in the art will also appreciate that routine banking activity may also be monitored to ensure that the beneficiary remains eligible to receive a benefit. For example, the present invention advantageously contemplates that activities relating to cashing checks at the beneficiary's financial institution may be considered when determining a banking transaction to provide evidence of under the table employment related income.

Continuing to reference FIG. 1, a general architectural structure of the system 10 will now be discussed. The system 10 may include a computerized device 110, a database 101, and/or a network 175 connective structure to communicate data with one or more connected computerized device 110. The computerized device 110 may further include a processor 120, memory 130, input/output (I/O) interface 160, and a network interface 170, which may be communicatively connected to one another via a bus 121. The processor 120 may be a microprocessor, CPU, controller, microcontroller, programmable logic device, array of logic elements, or state machine. A person of skill in the art will appreciate additional devices that may accept and process digital logic commands to produce a result to be included as a processor 120, as defined herein.

The computer may additionally include memory 130, which may be used to store and read one or more software module. The memory 130 may include random access memory (RAM), flash memory, read only memory (ROM), erasable programmable read only memory (EPROM), electrical erasable programmable read only memory (EEPROM), hard disk, removable disk, CD, DVD or any other form of storage medium known in the art. As will be appreciated by skilled artisans, a processor may be operatively connected to the storage medium to read and write information to and from the storage medium, respectively. Alternately, at least part of the memory 130 may be integrated into the processor 120.

The I/O interface 160 may be used to send and receive data communications between one or more external device. The I/O interface 160 may additionally be connected to the processor 120, memory 130, and other components of the computerized system 10 110 via the bus 121. A person of skill in the art will appreciate that additional embodiments are contemplated in which the I/O may be directly connected to the memory 130, processor 120, or other component, which are intended to be included within the scope and spirit of the present invention. FIG. 1 illustrates an example of the I/O interface 160 being connected between a bus 121 and the database 101. Skilled artisans will appreciate additional computerized devices 110 and components that may be connected to the present computerized device 110 through the I/O interface 160.

The computerized device 110 may additionally include a network interface 170, through which the present device may communicate with additional computerized devices 110 through a network 175, such as, for example, a banking computerized device 111 or a record custodian computerized device 112. A banking computerized device 111 may be a computerized device 110 that includes financial records and/or banking transactions relating to a beneficiary. A record data computerized device 112 may be a computerized device 110 that includes status records, such as employment records and/or other record data that may relate to the ineligibility of a beneficiary to receive a benefit. The computerized device 110 may additionally be connected to a database 101 via the network 175. The network 175 include a data communication pathway, though which a plurality of computerized devices 110 may exchange data, including the banking computerized device 111 and the record data computerized device 112.

The database 101 may be understood as a collection of data, which may be organized. The database 101 may include one or more additional database, which may include a subset of data generally included in the database 101. Examples of additional databases may include a rules database 103, profiles database 104, actions database 105, and an optional accuracy database 106. The rules database 103 may include rules to be performed and analyzed by a rules engine, which may be operated by a computer device. The rules may be ranked, for example, respective to the importance of the rule in determining ineligibility to receive a benefit. The profiles database 104 may include data relating to a beneficiary. The actions database 105 may include one or more actions that may be suggested by the system 10 based on a range of noncompliance. An accuracy database 106 may additionally include data relating to accuracy of previous recommendations, which data may be used to improve the accuracy of future recommendation made by the system 10 of the present invention.

Figure 2:
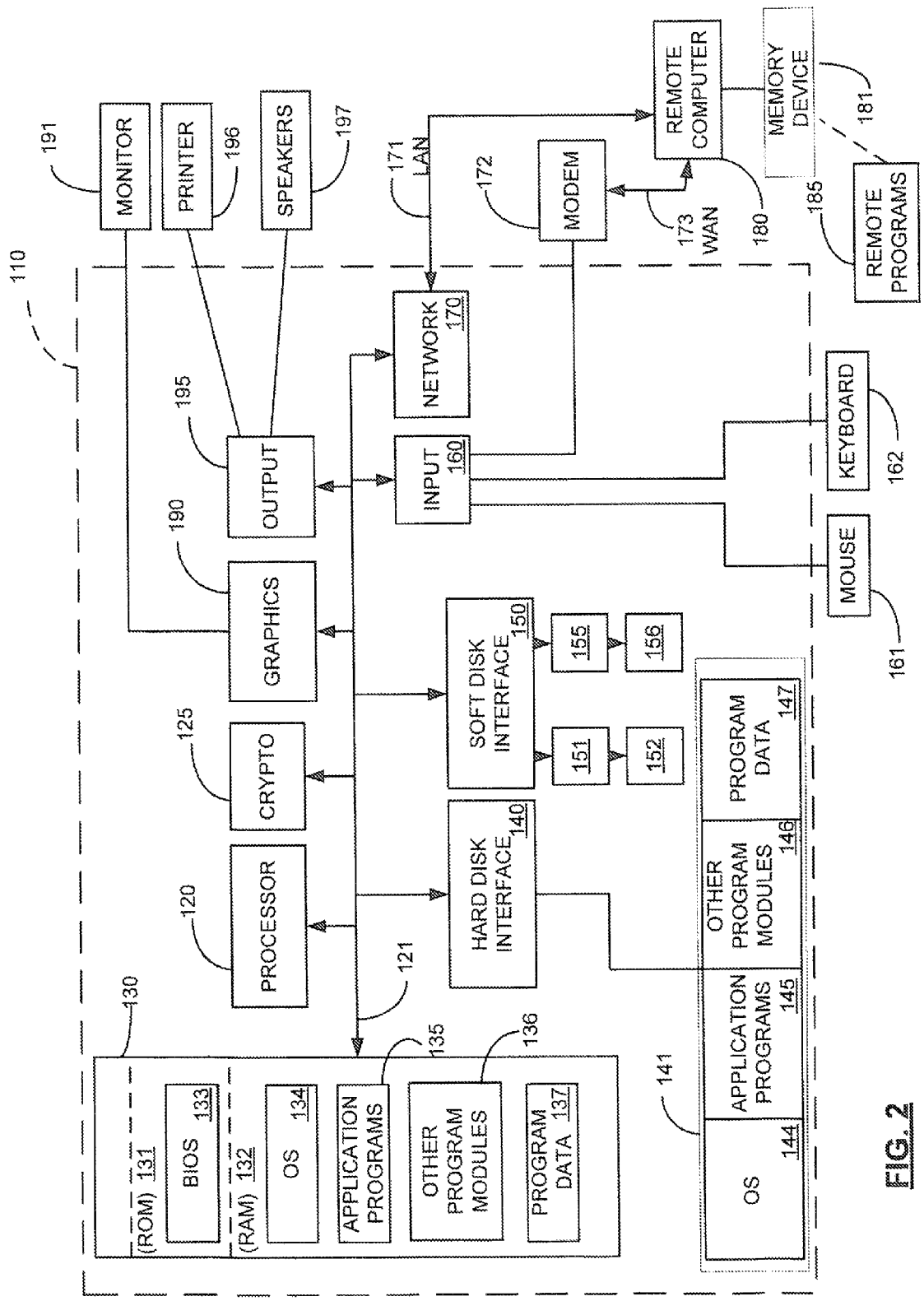
FIG. 2 is a block diagram of a computerized device that may be included in the system illustrated in FIG. 1.

FIG. 2 illustrates a detailed block diagram of an embodiment of a typical computerized device 110, which is capable of performing one or more computer-implemented steps in practicing the method aspects of the present invention. Components of the computerized device 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computerized device 110 may also include a cryptographic unit 125. Briefly, the cryptographic unit 125 has a calculation function that may be used to verify digital signatures, calculate hashes, digitally sign hash values, and encrypt or decrypt data. The cryptographic unit 125 may also have a protected memory for storing keys and other secret data. In other embodiments, the functions of the cryptographic unit may be instantiated in software and run via the operating system.

A computerized device 110 typically includes a variety of computer readable media. Computer readable media can be any available media that can be accessed by a computerized device 110 and includes both volatile and nonvolatile media, removable and non-removable media. By way of example, and in no way meant to be limiting, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by a computerized device 110. Communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media may include wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computerized device 110, such as during start-up, is typically stored in ROM 131. RAM 132 typically contains data and/or program modules that are immediately accessible to and/or presently being operated on by processing unit 120. By way of example, and not limitation, FIG. 2 illustrates an OS 134, application programs 135, other program modules 136, and program data 137.

The computerized device 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computerized device 110. In FIG. 2, for example, hard disk drive 141 is illustrated as storing an OS 144, application programs 145, other program modules 146, and program data 147. Note that these components can either be the same as or different from operating system 134, application programs 135, other program modules 136, and program data 137. The OS 144, application programs 145, other program modules 146, and program data 147 are given different numbers here to illustrate that, at a minimum, they are different copies. A user may enter commands and information into the computerized device 110 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computerized device 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computerized device 110, although only a memory storage device 181 has been illustrated in FIG. 2. The logical connections depicted in FIG. 2 include a local area network (LAN) 171 and a wide area network (WAN) 173, but may also include other networks 175. Such networking environments are commonplace in offices, enterprise-wide computer networks, intranets and the Internet.

When used in a LAN networking environment, the computerized device 110 is connected to the LAN 171 through a network interface 170 or adapter 170. When used in a WAN networking environment, the computerized device 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computerized device 110, or portions thereof, may be stored in the remote memory storage device. By way of example, and not limitation, FIG. 2 illustrates remote application programs 185 as residing on memory device 181.

The communications connections 170, 172 allow the device to communicate with other devices. The communications connections 170, 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

According to an embodiment of the present invention, a computer program product is disclosed, which may detect a potentially ineligible beneficiary that may be receiving a benefit. A computer program product, according to an embodiment of the present invention, will be described in further detail as a project that is creatable using, for example, but not intended as a limitation, Microsoft's Visual C# .NET development environment. Such a computer program product would be suitable for execution on a computerized device 110 having, for example, but not intended as a limitation, one of Microsoft's Windows family of operating systems loaded into memory 134. A person having skill in the art, after having the benefit of this disclosure, would recognize that many other development platforms might be used to perform the computerized methods disclosed herein, which may be executable with many other operating systems, but that still embody the present invention. As such, the following disclosure is provided merely for explanatory purposes and should in no way limit the present invention to computer program products that are created using the aforementioned development platform or for use with the aforementioned operating systems.

Figure 3:
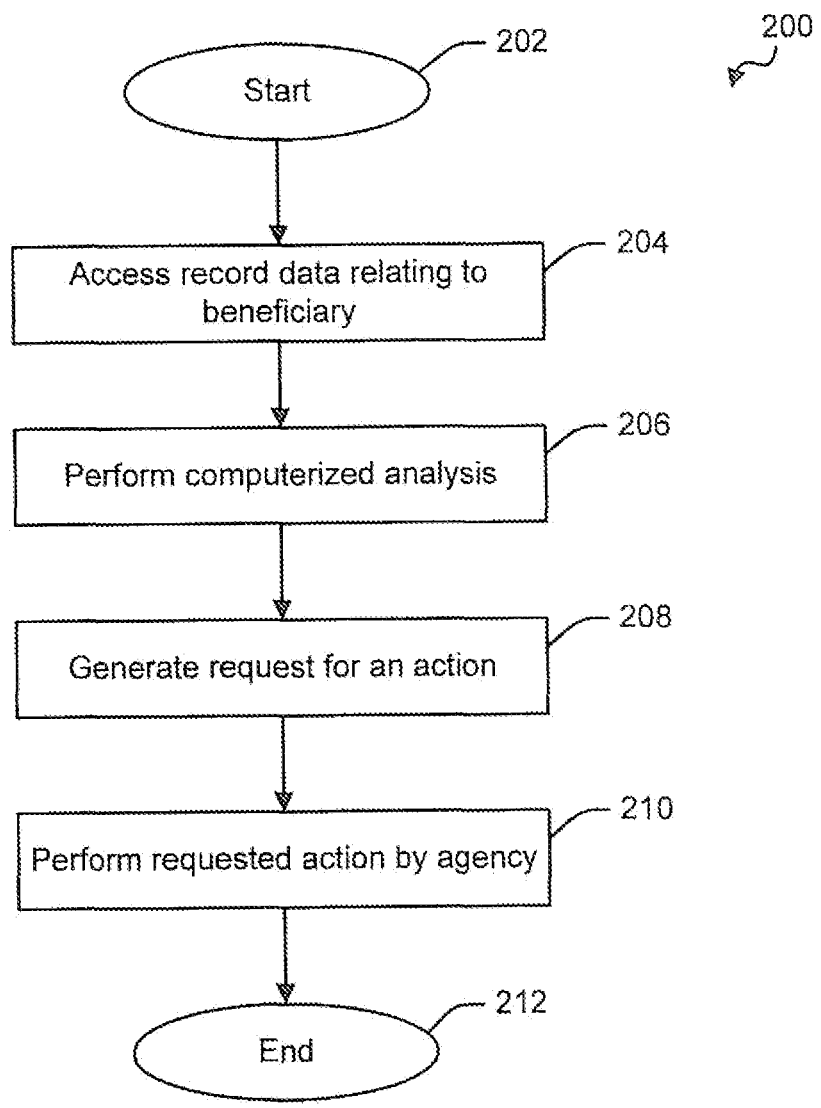
FIG. 3 is a flowchart illustrating general operation of the system illustrated in FIG. 1.

Referring now to flow chart 200 of FIG. 3, an illustrative method operation for generally assessing a beneficiary that may be ineligible to receive a benefit according to an embodiment of the present invention will now be discussed. Starting at Block 202, the system 10 may access record data relating to beneficiary (Block 204). The record data may be retrieved from a financial institution that may be connected through a network 175 using a computerized device that may also be connected to the network. The financial institution may include a banking computerized device 111 to communicate the record data. The system 10 may perform a computerized analysis on the record data (Block 206). The computerized analysis may, for example, process the data, search for patterns, or perform other analyses that would be appreciated by skilled artisans. Due to financial privacy concerns, financial transactions and other banking data relating to the beneficiary may remain within the bank systems, with only those beneficiaries whose patterns of banking transactions are indicative of noncompliance being identified to the government agency requesting the information. Of course, this invention is not to be limited based on individual policies of certain financial institutions with respect to release, or sharing, of information relating to a beneficiary. This is meant merely for exemplary purposes. The system 10 of the present invention contemplates that data relating to financial transactions of a beneficiary may be downloaded from a financial institution and stored on a separate server that is associated with providing a benefit.

After the record data has been analyzed, the system 10 may generate a proposed request for an action (Block 208). The requested action generated by the system 10 may be dependent upon the analysis performed at Block 206. The requested action may be performed by a user, such as an agency (Block 210). As an example, and without limitation, the agency may include the Social Security Administration, which may perform the action of auditing the account of a beneficiary to make a final determination regarding ineligibility to receive a benefit.

Figure 4:
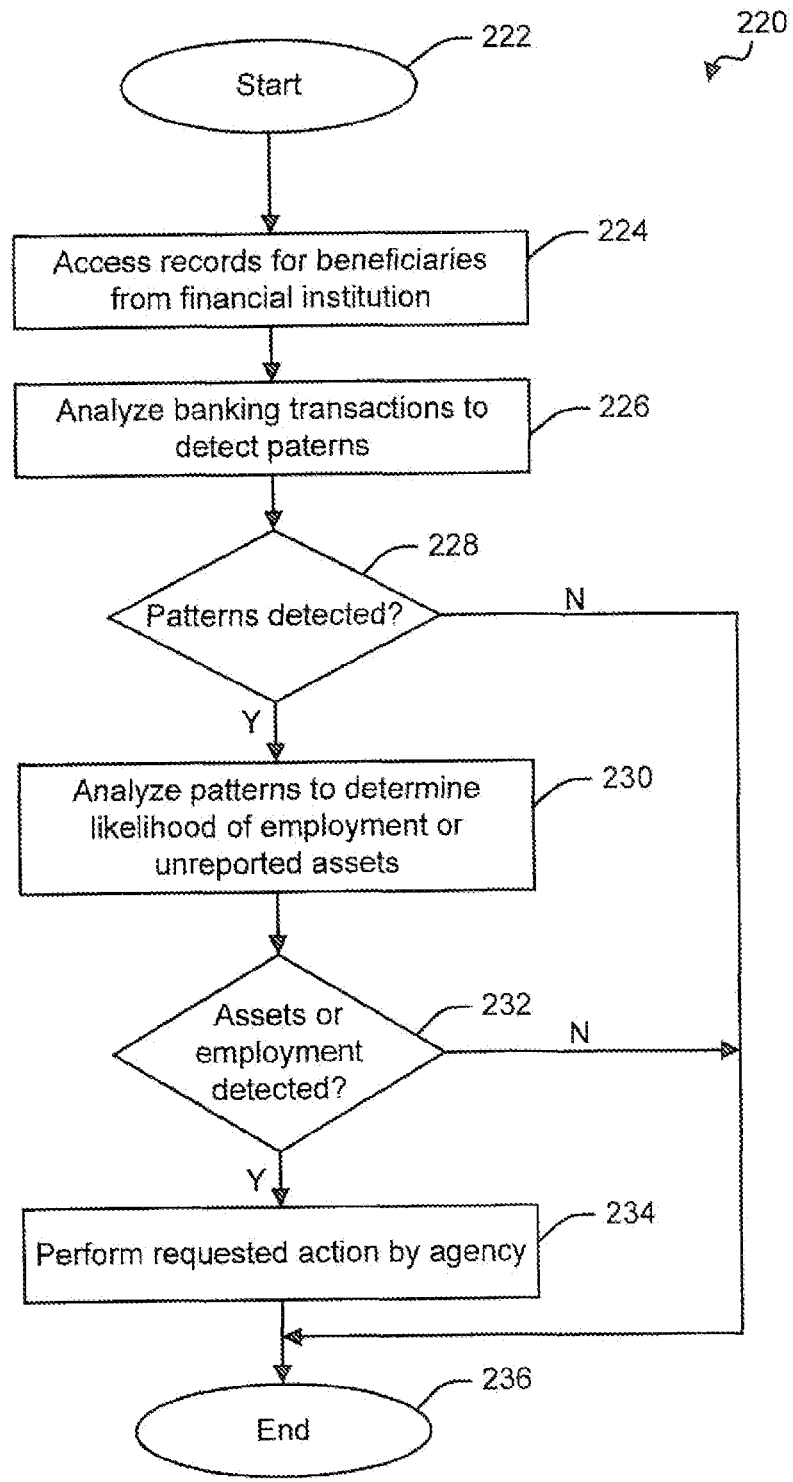
FIG. 4 is a flowchart illustrating detection and analysis of patterns in record data, according to an embodiment of the present invention.

Referring now to flow chart 220 of FIG. 4, an illustrative method operation for analyzing record data to recommend an action according to an embodiment of the present invention will now be discussed. A person of skill in the art will appreciate additional methods of analyzing record data, some of which will be discussed within this disclosure, to be included within the scope and spirit of the present invention. Starting at Block 222, the system 10 may access record data relating to a beneficiary from a financial institution (Block 224). The record data may relate to banking transactions, among other things. The system 10 may then analyze the banking transactions included in the record data to detect patterns (Block 226).

If it is determined at Block 228 that no pattern consistent with post-benefit employment by the beneficiary exists, or consistent with the existence of a new revenue stream for the beneficiary, the operation may terminate at Block 236. However, if it is determined at Block 228 that a pattern does exist, the system 10 may analyze the pattern to determine the likelihood of employment or the existence of an unreported asset possessed by a beneficiary (Block 230). After the system 10 analyzes the pattern, it may determine whether the beneficiary is likely to have employment earnings and/or unreported assets, which could render the beneficiary ineligible to receive the benefit (Block 232). If the patterns, which may be indicated by the banking transaction, show that a beneficiary is not likely to be employed, or does not likely have unreported assets, the operation may terminate at Block 236. Conversely, if the beneficiary is likely employed, or likely has unreported assets, the system 10 may perform a requested action (Block 234). The requested action may, for example, be to generate a recommendation to audit the beneficiary. A person of skill in the art will appreciate that additional recommendations and/or actions may be generated by the system 10 as a result of a detected pattern, such as, for example, sending a warning communication to the beneficiary, or a request that the beneficiary contact the agency to provide an explanation for the suspect pattern as included in the scope of the present invention. The operation may then terminate at Block 236.

Figure 5:
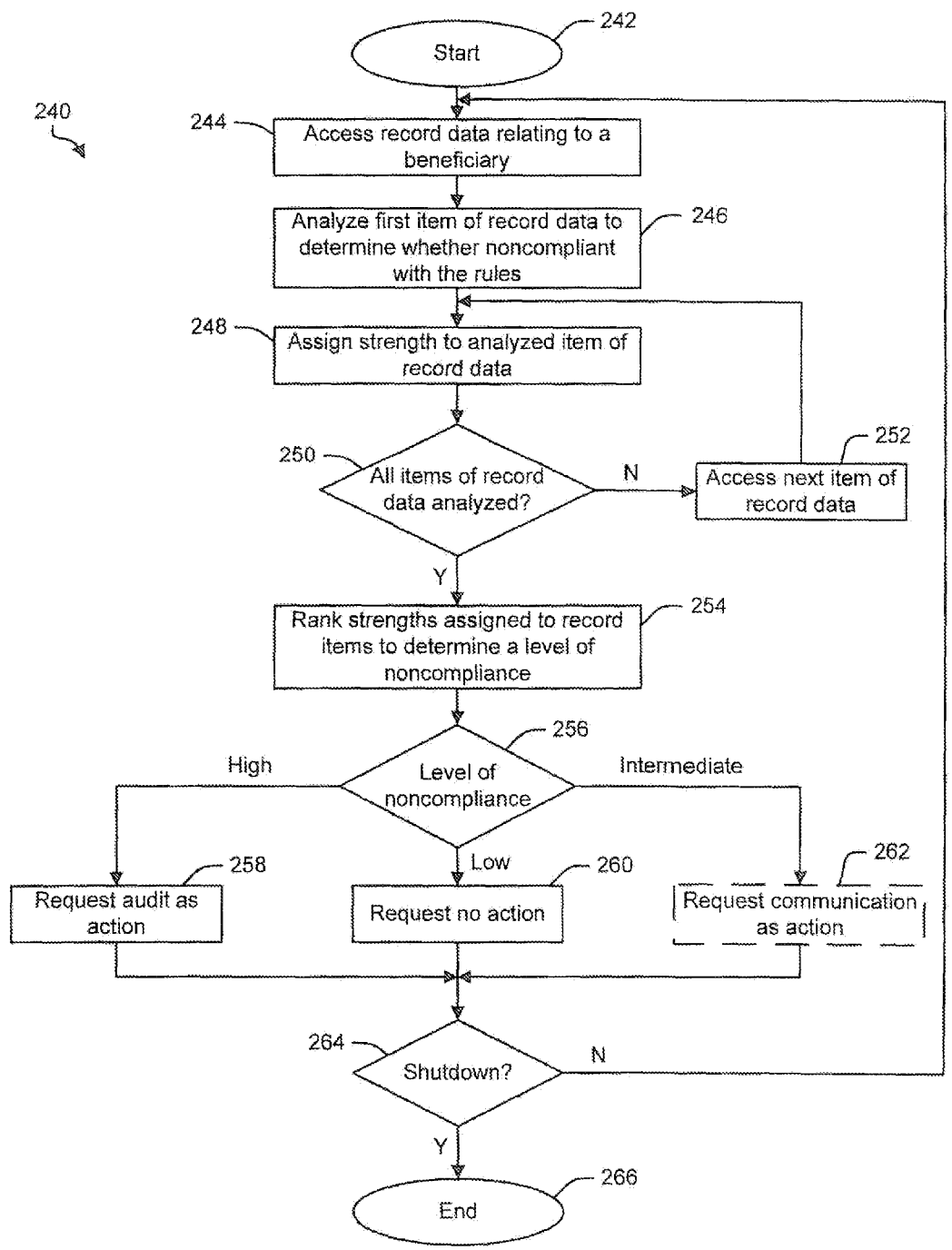
FIG. 5 is a flowchart illustrating a strength based analysis of patterns, according to an embodiment of the present invention.

Referring now additionally to flow chart 240 of FIG. 5, an illustrative method operation for determining an action to recommend relating to a level of noncompliance with a rule according to an embodiment of the present invention is now described in greater detail. Starting at Block 242, the system 10 may access record data relating to a beneficiary (Block 244). The system 10 may then analyze each item of record data included in the record relating to the beneficiary. More specifically, the system 10 may analyze a first item of record data to determine whether the item is noncompliant with the rules (Block 246). The system 10 may next assign a measurement of strength to the item of record data relating to noncompliance with the rule (Block 248). The strength of the rule may be related to the ranking of the rule, which may indicate the importance of the rule in determining whether a beneficiary may be ineligible to receive a benefit.

The system 10 according to the present invention may include several different types of rules that are used to detect compliance or noncompliance of a detected pattern relating to the beneficiary's banking transactions. The banking transactions, as indicated above, are provided as part of the record data that may be retrieved from the financial institution, or a records custodian, or analyzed while in the custody of the financial institution at the request of the government agency. The rules may be used to analyze a pattern of deposits that are made into the beneficiary's bank account. More specifically, without limitation, the rules may be used to analyze the amount of the deposits, the source of deposits and the intervals between deposits to assess the likelihood that the pattern is indicative of employment that may exceed an allowable threshold. The present invention also contemplates that deposit patterns that are probably indicative of a spouse's employment earnings which may be deposited into a bank account shared with the beneficiary, or income from other sources such a loans, trust fund payments, support from family etc, may be excluded from analysis. To accomplish this, a comparison of pre-benefit deposit patterns may be made with post-benefit deposit patterns. If the suspect deposit pattern existed before the benefit was started, then it may likely be an allowable income stream. If a new deposit stream begins after the start of benefits, then this may be an indication of employment, and therefore indicative of possible improper payments.

Those skilled in the art will appreciate that a similar analysis may occur with respect to withdrawals, i.e., a beneficiary's withdrawal transactions may also be analyzed in order to determine whether or not the withdrawal activity is indicative of employment, or another revenue stream, that may lead to an indication that the beneficiary is not eligible to receive the benefit. Therefore, the system 10 according to the present invention contemplates analyzing a pattern of withdrawals, analyzing a bank balance of the beneficiary, analyzing the origination of deposits, analyzing the types of payment made, analyzing the intervals between deposits or withdrawals, analyzing the size of deposits or withdrawals, or any analysis of any banking transaction that may indicate a pattern of behavior of the beneficiary with respect to the financial transactions of the beneficiary, as understood by those skilled in the art.

The system 10 may then determine whether all items of record data have been analyzed (Block 250). If items of record data remain to be analyzed, the system 10 may access the next item of record data (Block 252). The system 10 may then again proceed to perform the operation of Block 248, wherein it may assign a measurement of strength to the item of record data relating to noncompliance with the rule. Once the system 10 determines that all the items of record data have been analyzed at Block 250, the system 10 may rank the strengths assigned to the items of record data to determine a level of noncompliance of the beneficiary with the rules (Block 254).

As a specific example of the operation of flow chart 240, provided without limitation, the system 10 may determine at Block 254 that a beneficiary's account is noncompliant with at least one rule. However, the rule may not be ranked as highly important. As a result, the system 10 may indicate that; although the record data relating to a beneficiary is noncompliant with at least one rule, the level of noncompliance is low. Conversely, if the rule were ranked as highly important, the system 10 may indicate a high level of noncompliance upon the beneficiary being noncompliant with a single, highly important rule.

If it is determined at Block 256 that the level of noncompliance with the rules is high, the system 10 may generate a request for an audit of the account associated with the beneficiary (Block 258). Conversely, if it is determined that the level of noncompliance with the rules is low, the system 10 may generate a request for no action to be taken (Block 260). A plethora of optional intermediate threshold levels of noncompliance with the rules may result in the generation of requests for different actions. The system 10 may additionally define a range of acceptable noncompliance, which may analyze whether the noncompliance with the rules reaches a level of noncompliance that would result in generating a particular action.

As an example, provided without limitation, the system 10 may include an intermediate level of noncompliance with the rules, which may include a level of noncompliance that is above the low level but below the high level of noncompliance. Upon determination that the record data is indicative of an intermediate level of noncompliance with the rules, the system 10 may generate a request for a communication to be sent to the client (Block 262). Such communication may include educational materials to inform the beneficiary as to their responsibilities to promptly report employment earnings, or other requirements to be eligible to receive the benefit. Alternatively, the communication may include a warning that the record data associated with the beneficiary is indicative of noncompliance with the rules, such as being employed. The warning communication may additionally require the beneficiary to contact the government agency administering the benefits to explain the suspect patterns. The communication may also indicate that further noncompliance with the rules may result in the recommendation of another action, such as an audit. Such communication may require the beneficiary to provide an explanation of the suspect pattern or face suspension of benefits. The suspension may be immediate, or may take place over a time period. Those skilled in the art will appreciate that the system 10 according to the present invention contemplates that a suspension, if necessary, may automatically occur, or the beneficiary may, for example, be warned (possibly multiple times) that a lack of explanation of a pattern may result in a suspension of benefits as of a particular date. Automated communication systems may be used to minimize the need for expensive labor intensive interactions with agents, or other governmental employees, or other employees responsible for distributing and monitoring the benefits. Many false alerts can be dealt with easily by having the beneficiary call an Interactive Voice Response system, for example, and simply explain the suspect pattern.

The system 10 may then determine whether a shutdown command has been received (Block 264). If no shutdown command has been received, the system 10 may return to the operation of Block 244, wherein it may access the record data of a beneficiary. A person of skill in the art will appreciate that the subsequent performance of the operation included in Block 244 may relate to accessing the record data of one or more different beneficiaries, or the previously analyzed beneficiary. If a shutdown command has been received at Block 264, the operation may terminate at Block 266.

Figure 6:
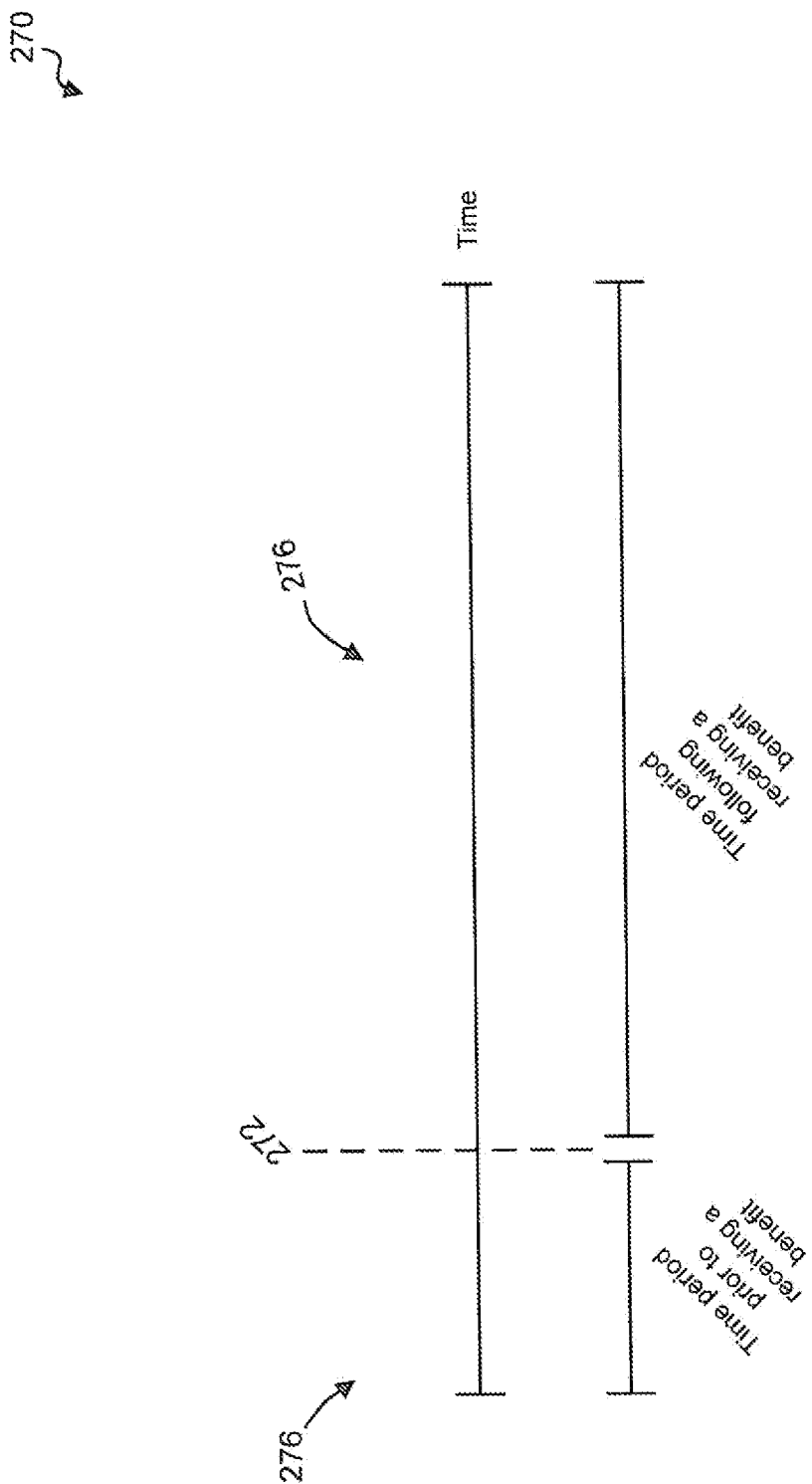
FIG. 6 is a timeline illustrating a time period prior to receiving the benefit and a time period following receiving the benefit, according to an embodiment of the present invention.

Referring now to the timeline 270 of FIG. 6, an embodiment of an analysis will now be discussed to determine noncompliance with one or more rule. More specifically, analysis relating to a banking transactions timeline will now be discussed. A person of skill in the art will appreciate that analyzing the record data with respect to the banking transactions timeline is provided herein as an example, and that additional analyses may occur to determine whether record data is compliant with the rules. Additionally, skilled artisans will appreciate that the banking transactions timeline is presented relative to receiving unemployment benefits, and different benefits may have differing timelines respective to the benefit.

The banking transactions timeline may include one or more event 272 that affects the analysis of the record data relating to a beneficiary. In the example of receiving unemployment benefits, an event 272 may include the commencement of unemployment benefits. The banking transactions that may have occurred prior to the event 272 may establish a time period prior to receiving a benefit 274, or a series of transactions prior the requirement of compliance with a condition. The banking transactions that may occur subsequent to the event 272 may be included in a time period following receiving the benefit 276, wherein noncompliance with the rules may make a beneficiary ineligible to receive the benefit. A person of skill in the art will appreciate that the record data may be analyzed to determine noncompliance with conditions, respective to the timeline 272 depicted in FIG. 6, among other factors.

Figure 7:
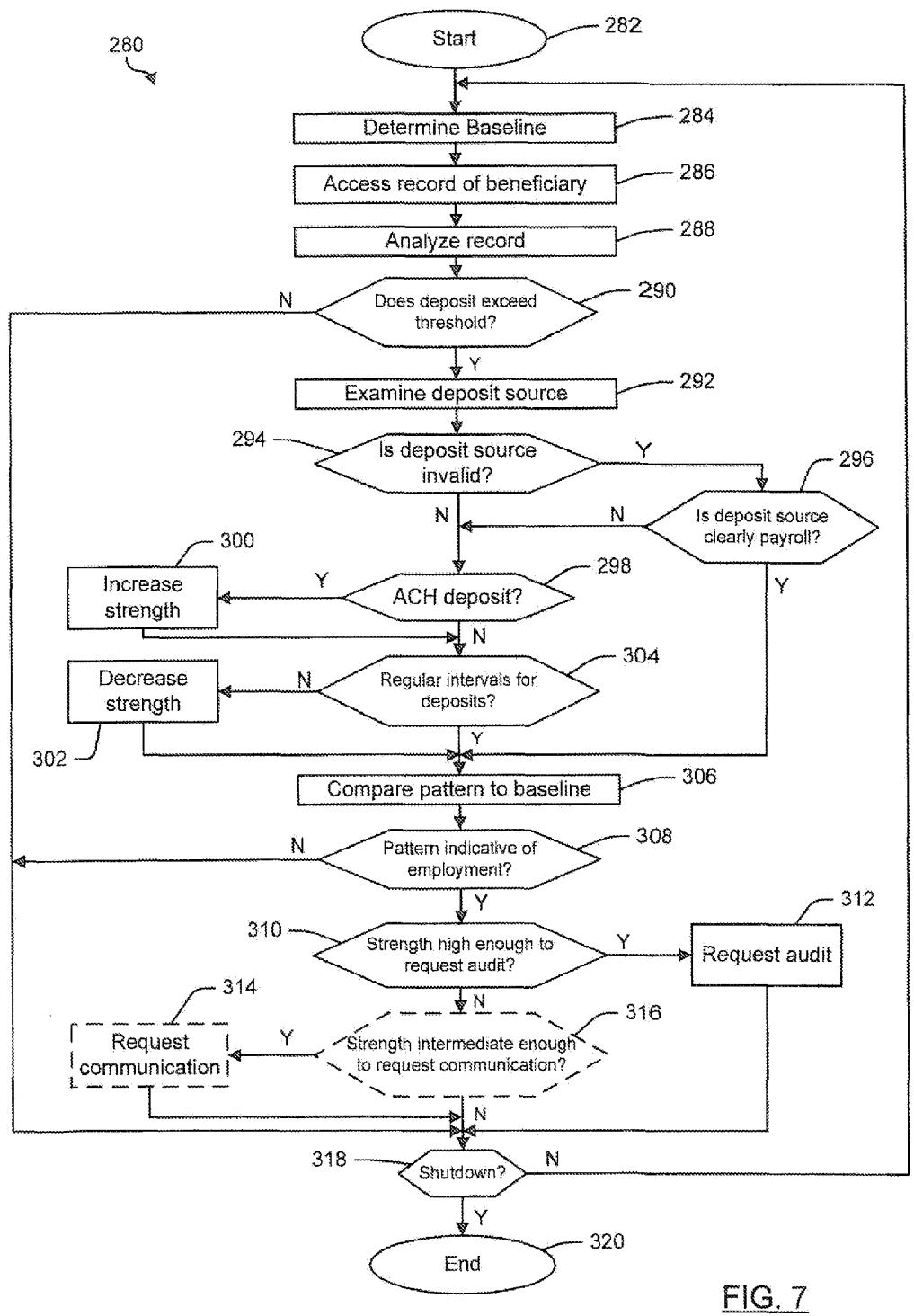
FIG. 7 is a flowchart illustrating analyzing deposits with a pre-benefit pattern, according to an embodiment of the present invention.
Figure 8:
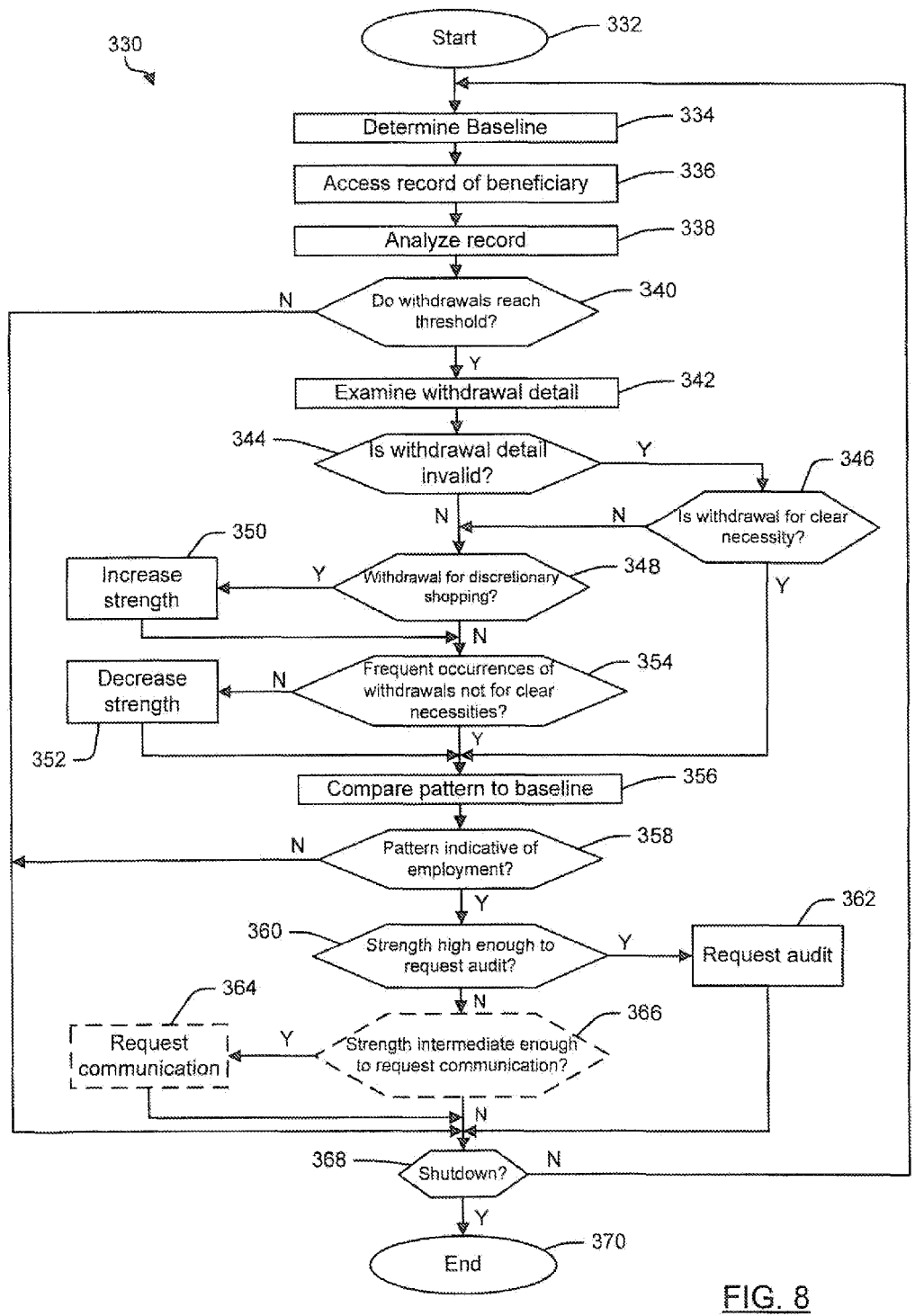
FIG. 8 is a flowchart illustrating analyzing withdrawals with a pre-benefit pattern, according to an embodiment of the present invention.

Referring now to flowcharts 280 and 330, of FIGS. 7 and 8, respectively, will now be discussed. More specifically, illustrative examples of analyses that may compare record data including one or more pre-benefit pattern to record data that include one or more post-benefit pattern will now be discussed. The pre-benefit pattern may relate to deposits and/or withdrawals that occur in the time period prior to receiving a benefit 274. Similarly, the post-benefit pattern may relate to deposits and/or withdrawals that occur in the time period following receiving the benefit 276. The pre-benefit pattern and the post-benefit pattern may be compared to determine deviations between each other. Deviations may be indicative of noncompliance with the rules, Referring now to flowchart 280 of FIG. 7, an illustrative example of an analysis operation to determine whether a beneficiary is ineligible to receive a benefit will now be discussed. More specifically, an illustrative example of an analysis that compares record data relating to deposits that occurs in the time period prior to receiving a benefit 274 to record data that occurs in the time period following receiving a benefit 276 to determine noncompliance with the rules will now be discussed. Starting at Block 282, the system 10 may determine a pre-benefit pattern, or baseline (Block 284). The baseline may be determined, for example, by analyzing banking transactions, such as deposits, that may occur prior to the event, i.e., prior to a claim for benefits is made. A person of skill in the art will additionally appreciate analyses that may be used to determine a baseline to be included herein.

Once a baseline has been established at Block 284, the system 10 may access the record data of the beneficiary. Skilled artisans may appreciate that the record data may additionally be accessed prior to establishing the baseline in order to access the record data used to establish the baseline. Additionally, the record data may be accessed subsequently or periodically to perform the actions of flowchart 280 at another time.

Once the record data of the beneficiary has been accessed at Block 286, the system 10 may analyze the record (Block 288). The system 10 may determine from the analysis whether a deposit included in the record exceeds a threshold (Block 290). The threshold may be predetermined, manually adjustable, dynamical adjustable, scaling, or otherwise variable. If the deposit being examined does not exceed the threshold, the operation may continue to Block 318, wherein it may be determined whether a shutdown command has been received. However, if a deposit is detected that may exceed the threshold at Block 290, the system 10 may examine the source of the deposit (Block 292).

The system 10 may determine whether the deposit source is invalid (Block 294). If it is determined that the deposit source is not invalid, the system 10 may next determine whether the deposit source includes an indication of an automated clearing house (ACH) deposit, or otherwise automated deposit (Block 298). However, if it is determined at Block 294 that the deposit source appears to be invalid, the system 10 may next determine whether the deposit source is likely a payroll deposit. A person of skill in the art will appreciate payroll deposits to include regular deposits of similar amounts, deposits that include a phrase such as "payroll," or other indicators that would apparent after having the benefit of this disclosure. If it is determined at Block 296 that the deposit is clearly payroll, the system 10 may perform the operation of Block 306, wherein it may compare the pattern of the deposit to the baseline. If the particular deposit pattern existed during the pre-benefit period it can be eliminated from suspicion. The system 10 can determine that a deposit pattern which existed during the pre-benefit period may likely constitute employment funds coming in for another account holder sharing the account, or funds that are not employment related and of no interest to the agency distributing the benefit. If it is determined at Block 296 that the deposit source is not clearly payroll at Block 296, the operation may proceed to Block 298 wherein it may be determined whether the deposit is an ACH deposit.

If the system 10 determines that the deposit is not an ACH deposit, it may determine whether the deposits are made at approximately regular intervals (Block 304). Alternatively, if the system 10 determines that the deposit is an ACH deposit, or an otherwise automated deposit, at Block 298, the system 10 may increase the strength of the pattern (Block 300) before continuing to the operation of Block 304.

If the system 10 determines that deposits are not made at approximately regular intervals at Block 304, it may compare the pattern of the deposits to the baseline (Block 306). The comparison between the pattern and the baseline may consider the relevance, or strength, of the pattern to the agency that is distributing the benefit. Alternatively, if the system 10 determines that the deposits are made at approximately regular intervals, or that deposits are made at approximately regular intervals and have a size that may be determined to be significant, or otherwise indicative of a suspect pattern of deposits, at Block 304, the system 10 may decrease the strength of the pattern (Block 302) before continuing to the operation of Block 306.

After comparing the pattern to the baseline, the system 10 may determine whether the pattern is indicative of employment (Block 308). This determination may weigh the strengths of the patterns with the ranking of the rules. If the pattern is not indicative of employment, the system 10 may proceed to the operation of Block 318, wherein it may determine whether a shutdown command has been received. Alternatively, the system 10 may generate a recommendation that no action be taken in regard to the beneficiary, for example, by recommending that the beneficiary not be audited. However, if the pattern is indicative of employment at Block 308, the system 10 may determine the strength of the pattern to determine whether an audit should be requested (Block 310).

If it is determined at Block 310 that the strength of the pattern is sufficiently high to request an audit, indicating a high level of noncompliance, the system 10 may request that the beneficiary be audited (Block 312). Alternatively, if the strength of the pattern is not sufficiently high to request an audit, indicating a low level of noncompliance, the system 10 may determine whether the strength of the pattern is high enough to require any number of intermediate actions.

To determine whether an intermediate level has been reached, the system 10 may include one or more audit thresholds. An audit threshold may relate to the strength of a pattern required for the system 10 to recommend an action. An audit threshold may be predetermined, dynamically variable, or otherwise adjustable. For exemplary purposes only, this audit threshold may differ for every agency or organization that is responsible for distributing the benefit. For example, modest earnings may be allowed under some benefits relating to unemployment claims program without impacting the benefits of the claimant. This may also be true for beneficiaries that may be receiving disability benefits. But those beneficiaries that may be receiving Supplemental Security Insurance payments, for example, may experience an almost immediate reduction in their benefits. Such a reduction may, for example, equate to approximately 50 cents for every dollar earned.

Those skilled in the art will appreciate that use of this system may include a refinement period. An algorithm may be run repeatedly against a database of known compliant and non-compliant beneficiaries until alerts produced by the algorithm, identify the non-compliant beneficiaries with a high degree of accuracy while minimizing the number of false positives that may be produced. This may advantageously allow the system 10 according to an embodiment of the present invention to be adjusted to certain parameters of a particular agency or entity that is responsible for distributing a benefit, and further advantageously allows the system to be readily used with respect to actual beneficiaries. Additional discussion regarding the machine learning aspect of an embodiment of the present invention is provided below.

As an example of an audit threshold, and presented without limitation, a single intermediate level of strength may be defined. A person of skill in the art will appreciate that any number of strengths may be defined and associated with a respective audit threshold. If the system 10 determines that the strength of a pattern rises above the level indicated by an audit threshold, it may recommend a different action than had the strength of the pattern fallen below the audit threshold. Skilled artisans will appreciate that a strength of a pattern that is directly at a audit threshold, for example, not above or below the threshold, may be defined by the system 10 to perform one or more action associate with being above or below the threshold, as the desired application may require.

Included as an example in flowchart 280, upon determining that the level of noncompliance is within an acceptable level of noncompliance, for example, the strength of the pattern is insufficient for requesting an audit, the system 10 may determine whether the strength of the pattern is at an intermediate level (Block 316). Examples of actions that may be requested for an intermediate strength of the pattern may include requesting that a communication be sent to the beneficiary (Block 314). The operation may then determine whether a shutdown command has been received at Block 318.

If the pattern is not indicative of intermediate strength, or any additional level of strength between the high level and the minimal level of strength, the system 10 may proceed to the operation of Block 318, wherein it may determine whether a shutdown command has been received. If no shutdown command has been receive, the system 10 may return to the operation of Block 284, wherein it may again determine a pre-benefit pattern or baseline. The subsequent operation of Block 284 may be performed in regard to the same beneficiary or a new beneficiary. If a shutdown command is received at Block 318, the operation may terminate at Block 320.

Referring now to flowchart 330 of FIG. 8, an illustrative example of an analysis operation to determine whether a beneficiary is ineligible to receive a benefit will now be discussed. More specifically, an illustrative example of an analysis that compares record data relating to withdraws that occur in the time period prior to receiving a benefit 274 to record data that occurs in the time period following receiving a benefit 276 to determine noncompliance with the rules will now be discussed. Starting at Block 332, the system 10 may determine a pre-benefit pattern, or baseline (Block 334). The baseline may be determined, for example, by analyzing banking transactions, such as withdrawals, that may occur prior to the event. A person of skill in the art will appreciate additional analyses that may be used to determine a baseline to be included herein.

Once a baseline has been established at Block 334, the system 10 may access the record data of the beneficiary. Skilled artisans may appreciate that the record data may additionally be accessed prior to establishing the baseline in order to access the record data used to establish the baseline. Additionally, the record data may be accessed subsequently or periodically to perform the actions of flowchart 330 another time.

Once the record data of the beneficiary has been accessed at Block 336, the system 10 may analyze the record (Block 338). The system 10 may determine from the analysis whether a withdrawal included in the record reaches or exceeds a threshold (Block 340). The threshold may be predetermined, manually adjustable, dynamical adjustable, scaling, or otherwise variable. If the withdrawal being examined does not reach the threshold, the operation may continue to Block 368, wherein it may be determined whether a shutdown command has been received. However, if a withdrawal is detected that may exceed the threshold at Block 340, the system 10 may examine the withdrawal in greater detail (Block 344). Withdrawal details may include, but should not be limited to, merchant information, ATM locations, transaction time, or other details indicative of the transaction.

The system 10 may determine whether the withdrawal details are invalid (Block 344). If it is determined that the withdrawal details are not invalid at Block 344, the system 10 may next determine whether the withdrawal is likely for discretionary shopping, or shopping that does not relate to food, bills, and other necessities (Block 348). However, if it is determined at Block 344 that the withdrawal details appear to be invalid, the system 10 may next determine whether the withdrawal details are clearly for necessities. A non-limiting example of withdrawal details indicative of an expense that is not clearly a necessity may include a large debit charge from the local pub near closing time.

If it is determined at Block 346 that the withdrawal is clearly a necessity, the system 10 may perform the operation of Block 356, wherein it may compare the pattern of the withdrawal to the baseline. If it is determined at Block 346 that the withdrawal is not clearly necessary at Block 346, the operation may proceed, to Block 348 wherein it may be determined whether the record data includes frequent occurrences of discretionary withdrawals.

If the system 10 determines that the withdrawals are not related to a clear necessity at Block 346, the system 10 may determine whether the withdrawals are for discretionary shopping (Block 348). A determination by the system 10 that the beneficiary has not made discretionary withdrawals may result in the system 10 continuing to Block 350, wherein it may determine whether frequent withdrawals have been made that are not for clear necessities (Block 354). Alternatively, if the system 10 determines that the withdrawals are apparently for discretionary shopping at Block 348, the system 10 may increase the strength of the pattern (Block 350) before continuing to the operation of Block 354.

If the system 10 determines that pattern of record data is not indicative of frequent occurrences of withdrawals that are not for clear necessities at Block 354, it may compare the pattern of the deposits to the baseline (Block 356). The comparison between the pattern and the baseline may consider the strength of the pattern during the analysis, among other determinations from the analysis. Alternatively, if the system 10 determines that frequent withdrawals are made for reasons that are not clear necessities, at Block 354, the system 10 may decrease the strength of the pattern (Block 352) before continuing to the operation of Block 356.

After comparing the pattern to the baseline, the system 10 may determine whether the pattern is indicative of employment (Block 358). This determination may weigh the strengths of the patterns with the ranking of the rules. If the pattern is not indicative of employment, the system 10 may proceed to the operation of Block 368, wherein it may determine whether a shutdown command has been received. Alternatively, the system 10 may generate a recommendation that no action be taken in regard to the beneficiary, for example, by recommending that the beneficiary not be audited. However, if the pattern is indicative of employment at Block 358, the system 10 may determine the strength of the pattern to determine whether an audit should be requested (Block 360).

If it is determined at Block 360 that the strength of the pattern is sufficiently high to request an audit, indicating a high level of noncompliance, the system 10 may request that the beneficiary be audited (Block 362), i.e., the system may initiate a request for an audit to be performed. The audit may be manually performed or may be automatically performed using the computerized device. The audit is intended to analyze several items to increase the probability of detecting when a beneficiary has become ineligible to receive the benefits. The audit may also trigger a search of various databases to verify the eligibility of the beneficiary to receive benefits. For example, the audit may access employment records, social security records, disability records, banking records from several different banks, corporate records (to inquire about corporate formation), court records (to indicate the award of any judgment including, but not limited to, alimony, child support, or the database of the government agency, or other agency responsible for distributing the benefit to see if the beneficiary recently reported earned income which failed to trigger the termination of their benefits, or any other types of records that may indicate employment or other alternative means of revenue that may be available to the beneficiary. Alternatively, if the strength of the pattern is not sufficiently high to request an audit, indicating a low level of noncompliance, the system 10 may determine whether the strength of the pattern is high enough to require any number of intermediate actions.

Included as an example in flowchart 330, upon determining that the level of noncompliance is within an acceptable level of noncompliance, for example, the strength of the pattern is insufficient for requesting an audit, the system 10 may determine whether the strength of the pattern is at an intermediate level (Block 366). Examples of actions that may be requested for an intermediate strength of the pattern may include requesting that a communication be sent to the beneficiary (Block 364). The communication may request that the beneficiary provide updated information to the agency so that a determination may be made as to whether or not the beneficiary remains eligible to receive a benefit. The operation may then determine whether a shutdown command has been received at Block 368. Again, the operation as described in Block 366 directed to determining whether or not the strength is intermediate in nature and requesting that a communication be sent to the beneficiary is an optional step.

If the pattern is not indicative of intermediate strength, or any additional level of strength between the high level and the minimal level of strength, the system 10 may proceed to the operation of Block 368, wherein it may determine whether a shutdown command has been received. If no shutdown command has been receive, the system 10 may return to the operation of Block 334, wherein it may again determine a pre-benefit pattern or baseline. The subsequent operation of Block 334 may be performed in regard to the same beneficiary or a new beneficiary. If a shutdown command is received at Block 368, the operation may terminate at Block 370.

Figure 9:
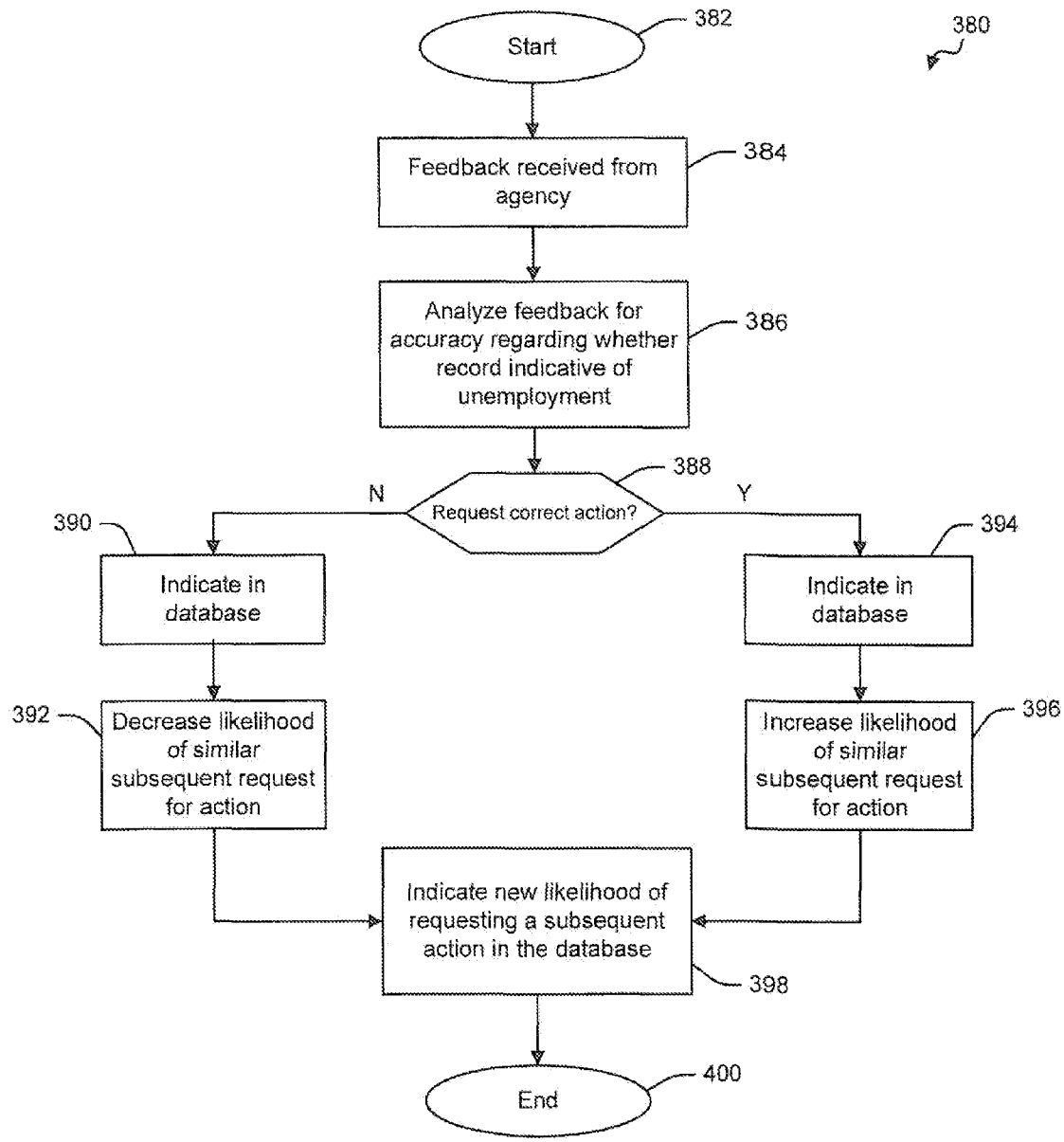
FIG. 9 is a flowchart illustrating analyzing feedback, according to an embodiment of the present invention.

Referring now additionally to flowchart 380 of FIG. 9, and illustrative example of a feedback system 10 that may be used to improve the accuracy of future determinations and recommendations will now be discussed. The feedback system 10 may include a manner of operations to improve the accuracy of recommended actions, such as, for example, machine learning. Starting at Block 382, the system 10 may receive feedback from the user, which may be an agency (Block 384). For example, and without limitation, the agency may interact with a user interface to input the results of an audit that had been recommended by the system 10, indicating whether the beneficiary that had been indicated by the system as potentially ineligible to receive a benefit was, in fact, ineligible. Skilled artisans will appreciate the inclusion of feedback relating to additional recommendations that may be made by the system 10 to be within the scope of the present invention.

The system 10 may then analyze the feedback to determine the accuracy of a prior prediction regarding a record indicative of unemployment (Block 386). After the analysis has been completed, the system 10 may determine whether the recommendation for an action was correct (Block 388). If the recommendation was not correct at Block 388, the system 10 may indicate the incorrect recommendation in the database 101 (Block 390). This indication may decrease the likelihood of the system 10 making a similar subsequent request for the action (Block 392). For example, if the system 10 recommended an audit of a beneficiary due to, for example, a new post-benefit income stream of ACH deposits that occurred at two week intervals and appear to be paychecks, and feedback from the beneficiary disclosed that they paychecks are to his spouse who recently started a new job, the system 10 may decrease the likelihood of recommending an audit for the similar subsequent transactions at least for that particular income stream for that particular beneficiary Additionally, if the recommendation was correct at Block 388, the system 10 may indicate the correct recommendation in the database 101 (Block 394). This indication may increase the likelihood of the system 10 making a similar subsequent request for the action (Block 396). For example, if the system 10 recommended an audit of a beneficiary due to large deposits made every two weeks from a national retail chain and there no other account holders are listed on the account, and the beneficiary is receiving unemployment funds, the system 10 may increase the likelihood of recommending an audit for the similar subsequent transactions.

After the system 10 has increased or decreased the likelihood of similar subsequent requests for an action, at Blocks 392 and 396, respectively, the system 10 may indicate the new likelihood of requesting a subsequent action in the database 101 (Block 398). The operation may then terminate at Block 400.

Figure 10:
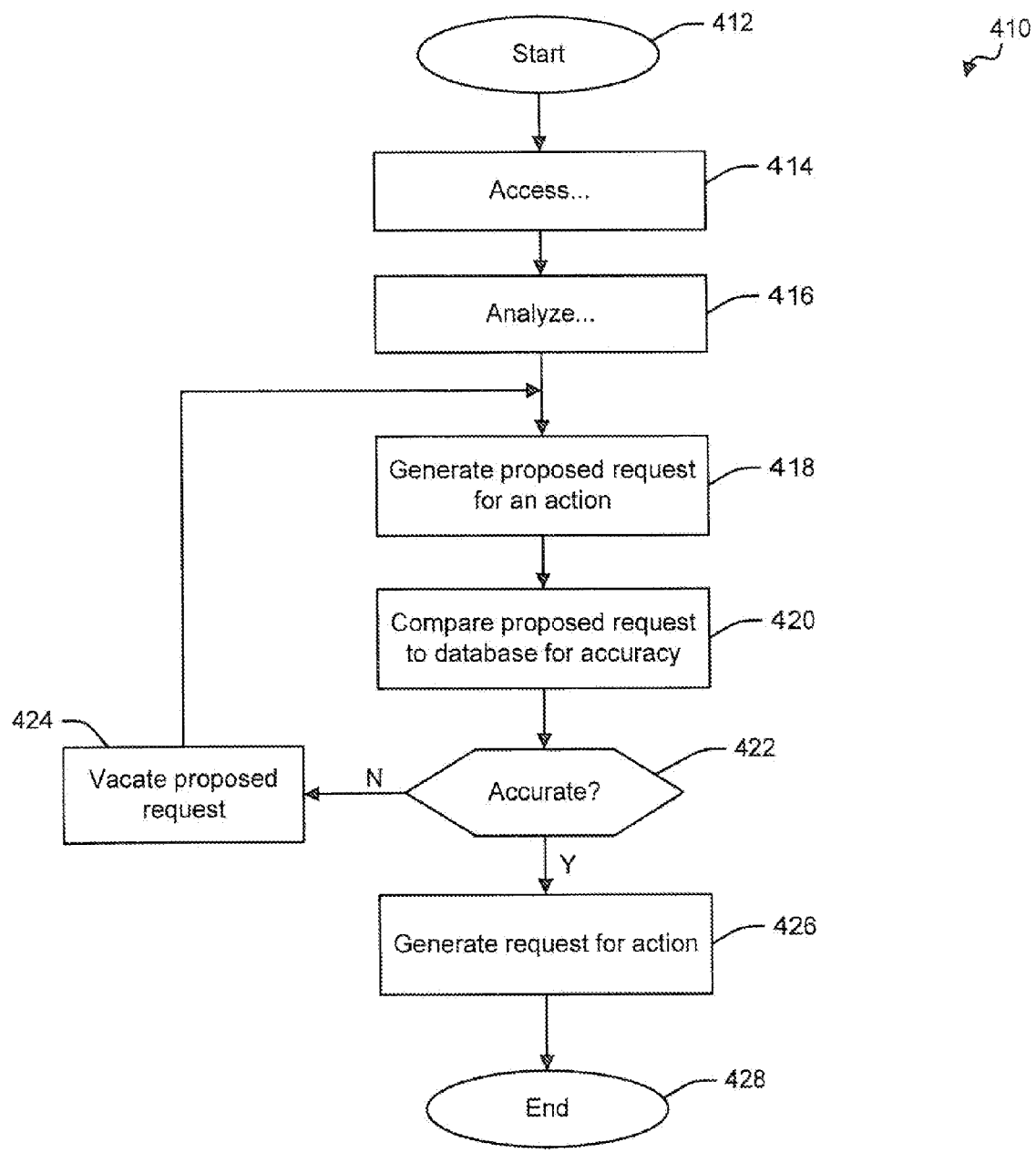
FIG. 10 is a flowchart illustrating use of feedback to increase the accuracy of recommending actions, according to an embodiment of the present invention.

Referring now additionally to flowchart 410 of FIG. 10, an additional operation for applying the accuracy of prior recommendations to improve the accuracy of subsequent recommendations will now be discussed. The accuracy information may have been determined in flowchart 380, for example, and without limitation. Starting at Block 412, the system 10 may access a database 101 that includes data regarding accuracy of prior recommended actions (Block 414). The system 10 may next analyze the accuracy information (Block 416). Additionally, the system 10 may generate a proposed request for an action relating to the analysis performed on the record data of a beneficiary (Block 418). A person of skill in the art will appreciate that the operations of analyzing accuracy data and generating a proposed request for an action may occur sequentially, simultaneously, or in an alternate order.

The system 10 may compare the proposed request for an action to the previously accessed and analyzed accuracy data (Block 420). The system 10 may then determine whether the proposed request for an action is consistent with the accuracy data (Block 422). If the proposed request for an action is inconsistent with the accuracy data, such that the proposed request is likely to be inaccurate, the system 10 may vacate the proposed request (Block 424). The system 10 may return to the operation of Block 418, wherein it may then generate a new proposed request for an action.

Conversely, the system 10 may determine that the proposed request for an action is likely to be accurate at Block 422. Here, the system 10 may generate the request for an action (Block 426). The request may then be delivered to a user, such as an agency, through a user interface. The operation may then terminate at Block 428.

Figure 11:
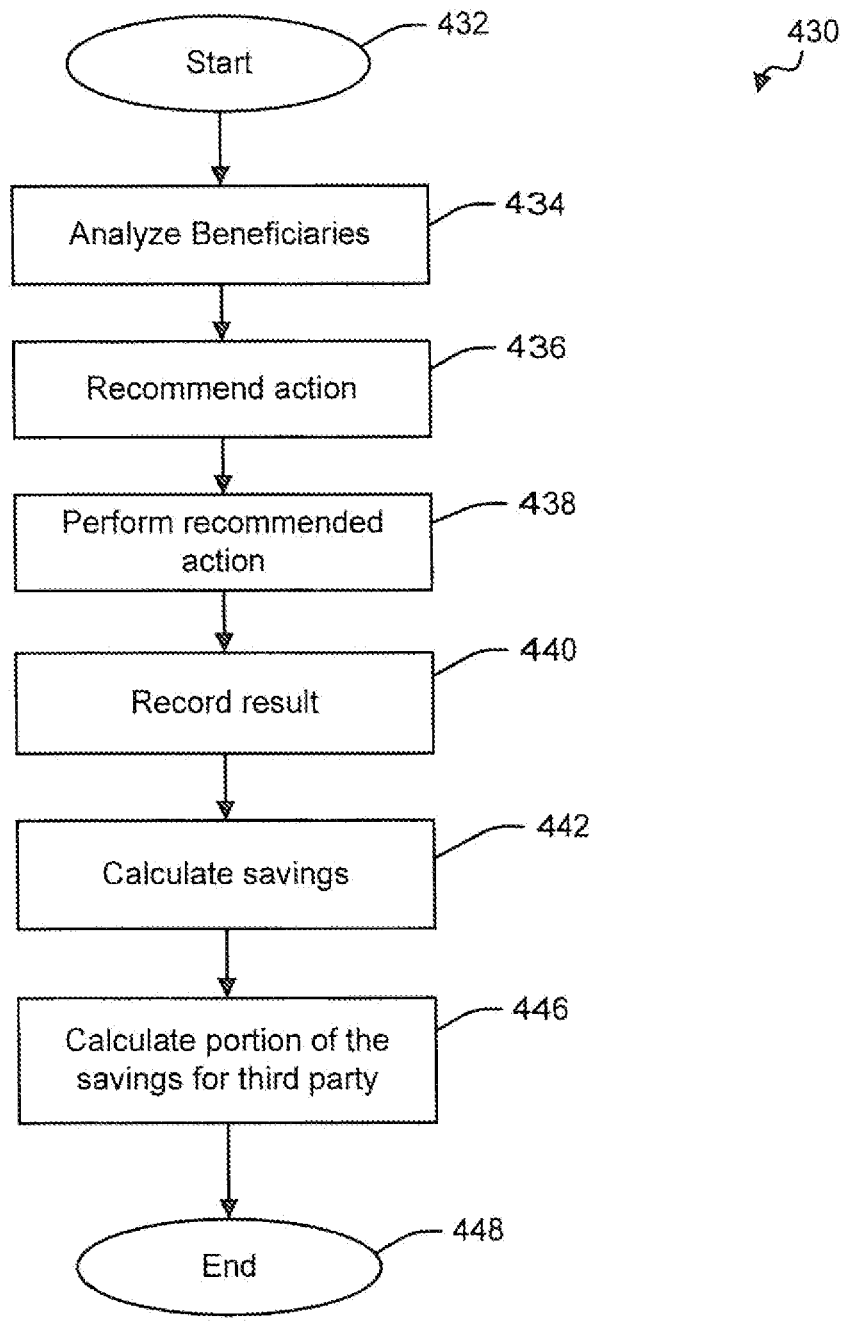
FIG. 11 is a flowchart illustrating calculating savings, according to an embodiment of the present invention.

Referring now to flowchart 430 of FIG. 11, an illustrative example of calculating savings will now be discussed. More specifically, an illustrative example of calculating savings between providing and denying benefits to ineligible beneficiary will now be discussed. Additionally, sharing a portion of the savings with a third party will also be discussed.

Starting at Block 432, the system 10 may analyze the record data of the beneficiaries (Block 434). After analyzing the record data, the system 10 may recommend an action (Block 436). A user, such as an agency, may then perform the recommended action (Block 438). Once the recommended action has been performed, the result of the action may be recorded in the database 101 (Block 440). The analysis of record data, recommendation of an action, and recordation of a result from performing the action have been discussed previously in the additional examples of this disclosure.

After the result has been recorded at Block 440, the system 10 may determine a cost savings from performing the recommended action (Block 422). The cost savings may be determined; for example, by finding the difference between the expense of providing the benefit to an ineligible beneficiary and the expense of denying the benefit to the ineligible beneficiary. A person of skill in the art will appreciate additional calculations that may be performed to calculate the savings realized by performing a successfully recommended benefit.

The system 10 may next determine a portion of the savings, which may be paid to a third party (Block 446). The portion of savings paid to the third party may be included as a fee for using the system 10 disclosed herein. Alternatively, a portion of the savings may be directed to an account or department to further increase the operational capacity and/or efficiency of the account or department. The operation may then terminate at Block 448.

Skilled artisans may additionally appreciate that the calculations of savings may be calculated over the record data various beneficiaries. Performance of savings calculations over a plurality of beneficiaries may allow the system 10 to increase the accuracy of actual savings over a calculating relating to a single beneficiary. A further increased accuracy may be realized by including the expense of auditing the record data of beneficiaries that are not ineligible to receive the benefit.

A person of skill in the art will appreciate that the preceding example has been described with detail in the interest of clearly describing an embodiment of the present invention. Skilled artisans will appreciate additional embodiments of the present invention, wherein the organization, interaction, and operation may include differences from the aforementioned example yet consistent with the scope and spirit of the present invention. As a result, skilled artisans would appreciate such differences are should not be excluded from the scope of the present invention. Many modifications and other embodiments of the present invention will come to the mind of one skilled in the art having the benefit of the teachings presented in the foregoing descriptions and the associated drawings. Therefore, it is understood that the invention is not to be limited to the specific embodiments disclosed.

That which is claimed is:

1. A method for determining beneficiary eligibility, the method comprising:
    accessing record data from a financial institution relating to banking transactions of a potentially ineligible beneficiary;
    analyzing the record data to determine a pattern of the banking transactions for a time period prior to receiving the benefit being defined as a pre-benefit pattern and for a time period following receiving the benefit being defined as a post-benefit pattern;
    identifying deviations between the pre-benefit pattern and the post-benefit pattern;
    applying a rule selected from a plurality of rules stored on a database to the deviations to determine a level of noncompliance of each of the deviations with the rule;
    determining a level of overall noncompliance of the deviations by analyzing the level of noncompliance of each of the deviations;
    determining if the level of overall noncompliance is within a range of acceptable noncompliance;
    wherein each of the rules is assigned a predetermined rank according to its importance in determining overall noncompliance with respect to the other rules of the plurality of rules;
    wherein compliance with the rule results in no action being taken;
    wherein the level of overall noncompliance being within the range of acceptable noncompliance results in no action being taken;
    wherein the level of overall noncompliance being outside the range of acceptable noncompliance results in determining if the level of overall noncompliance is above an audit threshold;
    wherein the level of overall noncompliance being above the audit threshold results in auditing the record data relating to the beneficiary;
    wherein the level of overall noncompliance being below the audit threshold results in communicating with the beneficiary;
    wherein the request for the action to be taken is provided to a user using a user interface; and
    wherein accessing the record data, analyzing the record data, identifying the deviations between the pre-benefit pattern and the post-benefit pattern, applying the rule, determining the level of noncompliance, and determining if the level of noncompliance is within the range of acceptable noncompliance are carried out using a computerized device.

2. A method according to claim 1 wherein the record data includes data relating to a deposit of funds; wherein analyzing the record data further comprises analyzing the data relating to the deposit to indicate the pattern of the banking transactions.

3. A method according to claim 1 wherein the record data includes data relating to a withdrawal of funds; wherein analyzing the record data further comprises analyzing the data relating to the withdrawal to indicate the pattern of the banking transactions.

4. A method according to claim 1 wherein the record data includes data relating to a deposit of funds and a withdrawal of funds; wherein analyzing the record data further comprises analyzing the deposit and withdrawal to indicate the pattern of banking transactions.

5. A method according to claim 1 further comprising providing a recommendation that the benefit be provided to the beneficiary upon determining that the level of noncompliance is within the range of acceptable noncompliance.

6. A method according to claim 1 further comprising:
    defining a savings to include a difference between the benefit provided to the beneficiary prior to the benefit being denied and the benefit provided to the beneficiary subsequent to the benefit beings being denied; and
    sharing a portion of the savings with a third party.

7. A method according to claim 1 wherein the computerized device includes a network interface that connects to a network; and wherein analyzing the record data to determine the pattern of the banking transactions further comprises communicating with a banking computerized device through the network.

8. A method according to claim 1 wherein the computerized device includes a network interface that connects to a network; and wherein analyzing the record data to determine the pattern of the banking transactions further comprises communicating with a record custodian computerized device through the network and accessing a status record indicative of ineligibility to receive the benefit from the record custodian computerized device, the status record including evidence of the level of noncompliance with the rules.

9. A method according to claim 1 wherein determining whether the level of noncompliance with the rules is within the range of acceptable noncompliance further includes machine learning, the machine learning comprising:
    receiving feedback relating to an accuracy of the determination of ineligibility of the beneficiary, the feedback being indicative of the accuracy of an identification of a prior pattern indicative of ineligibility of the beneficiary to receive the benefit;

accessing the feedback prior to generating a subsequent request for the action;

analyzing the feedback to improve the accuracy of the subsequent request for the action.

10. A method for determining beneficiary eligibility, the method comprising:

accessing record data from a financial institution relating to banking transactions of a potentially ineligible beneficiary;

analyzing the record data to determine a pattern of the banking transactions;

applying a rule selected from a plurality of rules stored on a database to the pattern;

determining a level of overall noncompliance of the pattern by analyzing the level of noncompliance of each of the banking transactions;

determining if the level of overall noncompliance is within a range of acceptable noncompliance;

wherein compliance with the rule results in no action being taken;

wherein the level of overall noncompliance being within the range of acceptable noncompliance results in no action being taken;

wherein the level of overall noncompliance being outside the range of acceptable noncompliance results in determining if the level of overall noncompliance is above an audit threshold;

wherein the level of overall noncompliance being above the audit threshold results in auditing the record data relating to the beneficiary;

wherein the level of overall noncompliance being below the audit threshold results in communicating with the beneficiary;

wherein the request for the action to be taken is provided to a user using a user interface;

wherein each of the rules is assigned a predetermined rank according to its importance in determining overall noncompliance with respect to the other rules of the plurality of rules;

wherein accessing the record data, analyzing the record data, applying the rule, determining the level of noncompliance, and determining if the level of overall noncompliance is within the range of acceptable noncompliance are carried out using a computerized device;

wherein the computerized device includes a network interface that connects to a network;

wherein analyzing the record data to determine the pattern of the banking transactions further comprises communicating with a banking computerized device through the network.

11. A method according to claim 10 wherein the record data includes data relating to at least one of a deposit and a withdrawal of funds; wherein analyzing the record data further comprises analyzing the data relating to at least one of the deposits and the withdrawal to indicate the pattern of the banking transactions.

12. A method according to claim 10 further comprising: defining a savings to include a difference between the benefit provided to the beneficiary prior to the benefits being denied and the benefit provided to the beneficiary subsequent to the benefit beings being denied; and sharing a portion of the savings with a third party.

13. A method according to claim 10 wherein determining whether the level of noncompliance with the rules is within the range of acceptable noncompliance further includes machine learning, the machine learning comprising: receiving feedback relating to an accuracy of the determination of ineligibility of the beneficiary, the feedback being indicative of the accuracy of an identification of a prior pattern indicative of ineligibility of the beneficiary to receive the benefit; accessing the feedback prior to generating a subsequent request for the action; analyzing the feedback to improve the accuracy of the subsequent request for the action.

14. A method according to claim 10 wherein analyzing the record data to determine the pattern of banking transactions further comprises communicating with a record custodian computerized device through the network and accessing a status record indicative of ineligibility to receive the benefit from the record custodian computerized device, the status record including evidence of the level of noncompliance with the rules.

15. A system for determining beneficiary eligibility, the system comprising: a network interface on a computerized device that connects to a network, the computerized device including a memory and a processor; a banking computerized device in communication with the network; and wherein record data from a financial institution relating to banking transactions of a potentially ineligible beneficiary is accessed using the computerized device; wherein the record data is analyzed using the computerized device to determine a pattern of the banking transactions; wherein a rule selected from a plurality of rules stored on a database is applied to the pattern of the banking transactions using the computerized device;

wherein a level of overall noncompliance of the pattern is determined using the computerized device by analyzing the level of noncompliance of each of the banking transactions; wherein the level of overall noncompliance is determined to be within a range of acceptable noncompliance using the computerized device; wherein compliance with the rule results in no action being taken; wherein the level of overall noncompliance being within the range of acceptable noncompliance results in no action being taken; wherein the level of overall noncompliance being outside the range of acceptable noncompliance results in determining if the level of overall noncompliance is above an audit threshold by the computerized device;

wherein the level of overall noncompliance being above the audit threshold results in auditing the record data relating to the beneficiary; wherein the level of overall noncompliance being below the audit threshold results in communicating with the beneficiary; wherein each of the rules is assigned a predetermined rank according to its importance in determining overall noncompliance with respect to the other rules of the plurality of rules; and wherein the request for the action to be taken is provided to a user using a user interface.

16. A system according to claim 15 wherein the record data includes data relating to at least one of a deposit and a withdrawal of funds; wherein the record data that is analyzed includes an analysis of the data relating to at least one of the deposit and the withdrawal to indicate the pattern of banking transactions.

17. A system according to claim 15 wherein a savings is defined to include a difference between the benefit provided to the beneficiary prior to the benefits being denied and the benefit provided to the beneficiary subsequent to the benefit beings being denied; and wherein a portion of the savings are shared with a third party.

18. A system according to claim 15 wherein feedback relating to an accuracy of the determination of ineligibility of the beneficiary is received by the computerized device, the feedback being indicative of the accuracy of an identification of a prior pattern indicative of ineligibility of the beneficiary to receive the benefit; wherein the feedback is accessed prior to generating a subsequent request for action; and wherein the feedback is analyzed to improve the accuracy of the subsequent request for action.

19. A system according to claim 15 further comprising a records custodian computerized device in communication with the network; wherein a status record stored on the record custodian computerized device that is indicative of ineligibility to receive the benefit is accessed through the network; and wherein the status record includes evidence of the level of noncompliance with the rules.

* * * * *